United States Patent
Shiba

(10) Patent No.: US 8,625,903 B2
(45) Date of Patent: Jan. 7, 2014

(54) POSE ESTIMATION

(71) Applicant: NEC Corporation, Tokyo (JP)

(72) Inventor: Hisashi Shiba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/753,672

(22) Filed: Jan. 30, 2013

(65) Prior Publication Data

US 2013/0148900 A1    Jun. 13, 2013

Related U.S. Application Data

(62) Division of application No. 12/367,178, filed on Feb. 6, 2009, now Pat. No. 8,401,295.

(30) Foreign Application Priority Data

Feb. 7, 2008 (JP) .................... 2008-027710

(51) Int. Cl.
  *G06K 9/00* (2006.01)
  *G09G 5/00* (2006.01)
(52) U.S. Cl.
  USPC ..................... 382/195; 382/100; 345/582
(58) Field of Classification Search
  USPC .......... 382/100, 103, 104, 154, 128, 131, 254, 382/115, 118, 168, 151, 155, 173, 181, 190, 382/201, 203, 195, 199, 232, 276, 312; 345/418, 419, 421, 420, 426, 582
  See application file for complete search history.

(56) References Cited

U.S. PATENT DOCUMENTS

| | | | | |
|---|---|---|---|---|
| 6,793,350 | B1 * | 9/2004 | Raskar et al. | 353/121 |
| 7,149,345 | B2 * | 12/2006 | Fujiwara | 382/154 |
| 7,227,973 | B2 * | 6/2007 | Ishiyama | 382/103 |

* cited by examiner

*Primary Examiner* — Sheela Chawan

(57) ABSTRACT

In a pose estimation for estimating the pose of an object of pose estimation with respect to a reference surface that serves as a reference for estimating a pose, a data processing device: extracts pose parameters from a binarized image; identifies a combination of pose parameters for which the number of cross surfaces of parameter surfaces that accord with surface parameter formulas, which are numerical formulas for expressing a reference surface, is a maximum; finds a slope weighting for each of cross pixels, which are pixels on each candidate surface and which are pixels within a prescribed range, that is identified based on the angles of the tangent plane at the cross pixel and based on planes formed by each of the axes of parameter space; and identifies the significant candidate surface for which a number, which is the sum of slope weightings, is a maximum, as the actual surface that is the reference surface that actually exists in the image.

20 Claims, 30 Drawing Sheets

A relational expression that indicates a straight line is expressed as $\rho = x \cos \theta + y \cos \theta$,
and $\theta$ and $\rho$ are expressed as parameters.

When a plurality of curves intersect at ($\theta_0$, $\rho_0$), the straight line of $\rho_0 = x \cos \theta_0 + y \cos \theta_0$ is considered to exist on plane x-y.

For each point that is detected,
a corresponding curve (parameter line) is plotted on plane θ-ρ.

**The coordinates of intersection of
the parameter lines are each different.**

For each point that is detected,
a corresponding curve (parameter line) is plotted on plane θ-ρ.

The parameter lines intersect at the same coordinates.

straight line having a length of 8 pixels straight line having a length of 8 pixels

Fig. 11 intersection list 421 (Fig10)

| pose parameter combination | significant candidate surface bit (BC) | actual surface bit (BR) |
|---|---|---|
| distance ρ - angle θ | "0" or "1" | "0" or "1" |
| .... | .... | .... |

POSE ESTIMATION

This application is based upon and claims the benefit of priority from Japanese patent application No. 2008-027710, filed on Feb. 7, 2008, the disclosure of which is incorporated herein in its entirety by reference.

BACKGROUND OF THE INVENTION

1. Field of the Invention

The present invention relates to a data processing device for estimating the pose of a device, a pose estimation system, a pose estimation method, and a program.

2. Description of the Related Art

There are many methods of measuring pitch, roll, and yaw, which are parameters that indicate the attitude of an air vehicle that flies through the air or space or a underwater vehicle that travels through water by a specific coordinate system of the ground surface, ocean surface, or ocean floor, and methods of measuring the height from the ground surface, ocean surface, or ocean floor or depth from the ocean surface, including measurement methods that use pose estimation sensors. Small unmanned air vehicle and underwater vehicle that are seeing increased use in recent years tend to incorporate various sensors that are specially directed to navigation and inspection in addition to pose measurement sensors. In particular, there is an increasing need for mounting cameras, radar, and sonar to obtain images. Sensors that are primarily directed to the capture of such images are referred to as "image sensors."

However, increase in the variety of mounted sensors results in greater complexity of the air vehicle or underwater vehicle systems (including systems for measuring the above-described parameters). As a result, not only do the design, fabrication, and maintenance of air vehicle or underwater vehicle systems entail considerable time and effort, but there is also a danger of an increase in the frequency of malfunctions.

In addition, the air vehicle and underwater vehicle systems become bulkier and heavier, and further, consume more power. It is desirable both from the standpoint of utility as well as from the standpoints of size and energy efficiency to decrease the variety of sensors mounted in air vehicle and underwater vehicle systems.

However, when image acquisition is the object of the air vehicle or underwater vehicle, image sensors are indispensable constituent elements. On the other hand, sensors for pose measurement of the air vehicle or underwater vehicle are also indispensable constituent elements for safe and precise navigation. Nevertheless, image sensors that are directed to the acquisition of images that can also substitute for pose measurement sensors can allow the omission of pose measurement sensors and can be considered effective for decreasing size and weight. In addition, although the widely used pose measurement sensors that use inertia may suffer a severe drop in accuracy in the presence of vibration, this problem can be circumvented if pose can be measured by the image sensors.

In addition, as methods of estimating the pose of an air vehicle or underwater vehicle that appears in images based on the acquired images, various techniques have been proposed for estimating pose from the appearance of known geographical features or landmarks. However, such techniques cannot be applied in locations in which geographical features or landmarks are difficult to recognize such as over a desert or ice field, in clouds or mist, or in water; in locations that lack beacons or precise topographical maps; or in locations in which geographical features have greatly changed or landmarks have been lost due to, for example, a disaster. Under these circumstances, the use of basic information such as the ground surface or ocean surface as a reference is extremely effective when figuring pose parameters.

However, when a substantially flat surface such as the surface of the earth or a surface having a high degree of symmetry such as a spherical surface is the standard, yaw is extremely difficult to find based on the appearance of the surface.

Nevertheless, the other principal pose parameters, i.e., altitude or depth, pitch, and roll, can be found. Yaw is not absolutely necessary when only minimum control of pose is necessary such as for avoiding collision with the surface of the earth or floor of the ocean or jumping out of from the ocean surface.

A position on a plane such as the surface of the earth, the ocean surface, or the ocean floor can be uniquely found if three points' positions on the plane are known. In a camera, irradiation of, for example, a laser allows the coordinates of a point on the plane to be found based on the principles of triangulation from the positional relation of the laser and camera. However, under noisy conditions such as at night or during bad weather, the use of only three points does not allow sufficient accuracy. In the case of radar or sonar, high accuracy is obtained by combining the data of as many points as possible due to the high level of noise caused by reflections from the ground surface, ocean surface, or ocean floor. For example, a plane is preferably identified by using the reflections of the entire ground surface in radar and by using the reflections of the entire ocean surface in sonar.

As a method of finding, from a multiplicity of points, a surface that is made up from this multiplicity of points, a method can be considered of first fitting a plane by means of the least squares method. This method, however, tends to be diverted toward values that greatly deviate from the average. In addition, proper fitting cannot be achieved when the ocean surface and ocean floor are simultaneously visible and the reverberations of each intermix such as in a shallow water.

The use of a three-dimensional Hough transform has been proposed as a method of finding a plane even in conditions of a high degree of noise. For easy understanding in the following explanation, a case is described of finding a straight line or curve by means of a Hough transform for a two-dimensional image having a high level of noise as an example.

In a Hough transform, an image (in this example, a two-dimensional image) is first subjected to binarization. The binarized image is next divided between a "candidate region" that is a region in which the existence of a straight line or a curve is predicted and a "background region" that is a region in which straight lines and curves are not predicted to occur. Next, taking as parameters the coefficients of formulas that express the lines that are to be detected, all combinations of parameters are found for all lines that can pass through each point contained in the candidate region. All combinations of parameters are plotted in parameter space that takes the parameters as axes to find straight lines or curves (hereinbelow referred to as "parameter lines"). Parameter lines are drawn for each point of the candidate region, and the points at which many parameter lines intersect are the parameter combinations that are to be detected.

Explanation next regards a case of straight-line detection that is widely used in the field of image processing. In the example that is next described, as shown in FIG. 1, for a straight line on an image, the distance ρ from the origin to any point (x, y) on the straight line can be expressed as $\rho = x \cos\theta + y \sin\theta$ using point (x, y) and angle 8 formed by a vector having the origin as its starting point and having point (x, y) as an endpoint with respect to the x-axis.

Although there are an enormous number of straight lines that can pass through point $(x_i, y_i)$ located in a candidate region on an image, this enormous number of straight lines becomes one parameter line in the parameter space that takes the above-described angle θ and distance ρ as axes (the θ–ρ plane) and can be expressed by the curve $\rho = x_i \cos\theta + y_i \sin\theta$. For example, a case is considered in which points A, B, and C located on one straight line exist within a candidate region as shown in FIG. 2. When the parameter lines that correspond to each of points A, B, and C are detected in this state, the point where the three parameter lines intersect $(\rho_0, \theta_0)$ is the parameter located on the straight line that is to be detected.

Therefore, the straight line that is to be detected is expressed by $\rho_0 = x \cos\theta_0 + y \sin\theta_0$ when the above-described relational expression is applied and distance $\rho_0$ and angle $\theta_o$ are used.

As disclosed in JP-1995-271978A, JP-1997-081755A, JP-1998-096607A, and JP-2003-271975A, various techniques have been proposed for detecting a plane by applying this method to three dimensions.

However, in the technique described in JP-1995-271978A, JP-1997-081755A, and JP-1998-096607A, once straight lines have been found in a plane, these straight lines are bundled to find the plane. As a result, these methods have a first problem that is the complexity of the processing for finding a plane. In addition, the restrictive conditions of a straight line are weaker than for a plane. As a result, when higher levels of noise components are included, straight lines which are strongly influenced by the noise components are detected, raising the concern of a decrease in processing efficiency.

In the technique disclosed in JP-2003-271975A, surfaces formed by three points to vote are found at first. This case also has a second problem in that the processing for finding a surface is complex. When there is higher levels of noise components, more points is preferably combined together to find a plane. In this case, the concern arises of a marked increase in the amount of processing in the technique disclosed in JP-2003-271975A.

In addition, as a problem common to typical techniques, there is a third problem that, when a plane is found, the transformation of parameters contained in the relational expression for expressing the plane that has been found and of pose parameters (for example, depth, altitude, pitch, and roll) that relate to the object of pose estimation is non-linear, whereby the accuracy of the pose parameters cannot be specified in advance. In other words, even when the accuracy (discretization widths) for the parameters of a formula that describes a plane in the parameter space of a Hough transform are each set identically, the accuracy for each pose parameter differ according to the values of the pose parameters and are not fixed on the same value. For example, when the relational expression that indicates coordinate z in the z direction of a point located on a surface is expressed by $z = ax + by + c$, using slope "a" for the x direction of the surface in the parameters of the Hough transform results in a nonlinear relation as regards slope "a" and pitch and roll, which are angles, and altitude, which is length. As a result, implementing a Hough transform by setting slope "a" at fixed periods does not result in fixed periods in the pose parameters.

In a Hough transform, a fourth problem exists of a danger that the potential for mistakenly identifying a false surface resulting from noise components as the "true surface" that is the surface to be detected changes (increases or decreases) according to the coordinates in the three-dimensional image. The potential for mistakenly identifying a false surface resulting from noise components as the "true surface" changes according to the coordinates in the three-dimensional image because a group of nearby pixels within a three-dimensional image that originally belong to a different surface are, due to their location within the three-dimensional image, recognized as having the same parameters, resulting in an increase in the number of pixels that are detected, and the increased number of pixels may become greater than the total number of detected pixel groups that belong to the true surface and that are located at other coordinates. To facilitate understanding of this type of phenomenon, a case will be explained in which a Hough transform is performed on a two-dimensional image.

A case will here be considered in which a straight line on a plane is detected by a Hough transform. For example, it is assumed that straight lines that pass through the point $(x_0, y_0)$ are expressed by $\rho = x_0 \cos\theta + y_0 \sin\theta$. In this case, a straight line that passes through $(x_0 + \Delta x, y_0 + \Delta y)$ located in the vicinity of the point $(x_0, y_0)$ is expressed by $\rho + \Delta\rho = (x_0 + \Delta x)\cos(\theta + \Delta\theta) + (y_0 + \Delta y)\sin(\theta + \Delta\theta)$. Still further, when approximation that ignores expansions relating to $\Delta x$, $\Delta y$, and $\Delta\theta$ and terms that are secondary or greater is applied to the relational expression that indicates this straight line, the straight line is expressed by $\Delta\rho \approx (\Delta x + y_0 \Delta\theta)\cos\theta + (\Delta y - x_0 \Delta\theta)\sin\theta$. This means that even when $\Delta x$, $\Delta y$, and $\Delta\theta$ are fixed values, when point $(x_0, y_0)$ that represents a position on an image differs, $\Delta\rho$ also differs accordingly.

This problem will next be explained by means of a specific example. As shown in FIG. 3a, a case is described in which there are two lines to be detected, line α and line β, point A being detected on line α, and point B and point C being detected on line β. In addition, as shown in FIG. 3b, parameter lines in parameter space that correspond to each of points A, B, and C intersect with each other at different coordinates.

On the other hand, in the example shown in FIG. 4a, the objects of detection are the two lines line α' and line β', point A' being detected on line α' and point B' and point C' being detected on line β'. The relative positions between each of points A', B', and C' shown in FIG. 4a are assumed to be identical to the relative positions between each of points A, B, and C shown in FIG. 3a. In this case, the parameter line that corresponds to point A', the parameter line that corresponds to point B', and the parameter line that corresponds to point C' intersect with each other at the same coordinates, as shown in FIG. 4b. In other words, the fourth problem is that, when the positions of each of the detected points differ, the form of intersection of the parameter lines that correspond to each of the points differs. Although a method has been proposed for circumventing this fourth problem regarding straight lines on a two-dimensional image, a method of circumventing the fourth problem for plane detection in a three-dimensional image has yet to be proposed.

In addition, there is a fifth problem that the problem of changes (increase or decrease) in the potential for mistakenly identifying a false surface resulting from noise components as the "true surface" according to the coordinates in a three-dimensional image is not limited to the case of detecting a plane within a three-dimensional image but can also occur when detecting a typical curved surface within a three-dimensional image.

In a typical method for computing area by counting the number of pixels contained in an image, the area included in the surface will be computed differently when the angle of view changes, even when the same surface is viewed from the object of pose estimation. As a result, the area included in the "true surface" after the angle of view has changed will in some cases be smaller than the threshold value for determining "false surfaces" that result from noise components. In such cases, a sixth problem arises that the "true surface" and a "false surfaces" resulting from noise components cannot be distinguished, resulting in the danger of the inability to detect the "true surface" after a change of angle. Counting the "crossing frequency (the "cross surface number" that will be described hereinbelow)" that indicates the crossing frequency of parameter surfaces in parameter space is equivalent to counting the number of pixels that belong to each surface detected on an image. However, when a surface is counted by pixels, the area of the surface becomes equal to that of the largest case of projecting this surface upon plane x-y, plane y-z, or plane z-x. In the interest of facilitating understanding, a two-dimensional Hough transform is here considered. Explanation here regards the case of a straight line having a length of 8 pixels, which is the length of a straight line on a simple plane rather than the area of a surface in three dimensions.

When the length of pixels aligned in the horizontal direction is taken as a reference, the straight line formed by a series of pixels shown in FIG. 5a and the straight line formed of a series of pixels shown in FIG. 5b have the same length (the length of eight pixels). However, the straight line shown in FIG. 5a has a length of approximately 11.3 pixels according to length measured based on Euclidean distance.

The sixth problem is next explained taking the example of a surface in a three-dimensional image. The example shown in FIG. 6 compares plane A that is tilted by exactly angle θ with respect to plane z-x and plane B that forms an angle of "0" with respect to plane z-x. In this example, each of planes A and B are assumed to have regions in which boundaries are set by each of the sides of rectangles. The measurement of the area of a surface is the measurement of the number of pixels, and when surface A that is tilted by an angle θ is projected onto plane z-x and matches with plane B, the surface of plane A is discerned to be equal to the surface of plane B. However, when the area included in plane A is calculated based on the length in the vertical direction and the length in the horizontal direction as measured by Euclidean distance, the area of plane A is greater than the area of plane B. This application of the latter area measurement method is appropriate both from the standpoint of the visual confirmation of the user and from the standpoint of finding the area based on the actual physical object.

In a typical Hough transform, these standpoints are not taken into consideration. As a result, although the area of a plane that is to be detected in excessive noise differs from the area of a false plane resulting from noise components can be clearly distinguished by means of a threshold value, the angle of view may sometimes cause the area of the "true surface" to fall below this threshold value. In other words, even when a threshold value is provided for distinguishing a "true surface" from "false surfaces", the danger remains that the orientation of the surface may cause the area of the true plane that is to be detected to fall below the threshold value and thus prevent detection of the true plane.

SUMMARY OF THE INVENTION

It is an object of the present invention to provide a data processing device, a pose estimation system, a pose estimation method, and a program that can solve the above-described problems.

The data processing device of the present invention for solving the above-described problems is a data processing device for, based on an image received as input, estimating the pose of an object of pose estimation with respect to a reference surface that is the reference for estimating pose and includes: a binarization unit for dividing the image into a candidate region that is a candidate for the reference surface and a background region that is a region other than the candidate region; a surface parameter formula expression unit for extracting pose parameters that indicate the pose of the object of pose estimation with respect to a reference surface that appears in the image received as input and, based on a combination of values obtained by implementing a transform by a prescribed function upon, of the pose parameters that were extracted, parameters that indicate the direction in which the object of pose estimation is directed and pose parameters other than the parameters that indicate direction, finding surface parameter formulas that are numerical formulas that express the reference surface; a parameter computation unit for, based on pose parameters that were extracted by the surface parameter formula expression unit, computing the combination of pose parameters that make up the surface parameter formulas that express all surfaces that pass through each pixel contained in the candidate region that was divided by the binarization unit; a parameter surface drawing unit for, based on the combination of pose parameters computed by the parameter computation unit, drawing parameter surfaces in accordance with the surface parameter formulas on parameter space, which is space that includes each of the parameters belonging to the pose parameters as the axes of base vectors; an intersection detection unit for finding cross point coordinates, which are the coordinates of intersections through which pass a plurality of the parameter surfaces that were drawn by the parameter surface drawing unit, and a cross surface number, which is the number of parameter surfaces that pass through the cross point coordinates; a significant candidate extraction unit for, when the cross surface number at each cross point that was found by the intersection detection unit is compared with the cross surface numbers at other cross point coordinates in prescribed neighboring regions that take as a reference the cross point coordinates corresponding to the cross surface number and is thus determined to be a maximum, identifying the combination of pose parameters that make up the parameter surface that corresponds to the determined cross surface number as a significant candidate that is an optimum combination of pose parameters for expressing the reference surface; a significant candidate surface drawing unit for, based on a significant candidate identified by the significant candidate extraction unit and a combination of pose parameters that were computed by the parameter computation unit for which distance to the significant candidate in parameter space in prescribed neighboring regions that take the significant candidate as a reference is no greater than a prescribed value, drawing significant candidate surfaces on the image; a cross determination unit for, regarding each significant candidate surface that was drawn by the significant candidate surface drawing unit, identifying pixels that are located on, of the candidate region, the significant candidate surface, and pixels that are located within a prescribed range from the significant candidate surface as cross pixels and finding coordinates of the cross pixels and tangent planes at the cross pixels; a weighting computation unit for, based on angles that are formed by tangent planes in cross pixels that were found by the cross determination unit and planes that are formed by the axes of each base vector included in the parameter space, finding a slope weighting for each cross pixel that was identified by the cross determination unit; a number measurement unit for computing for each of the significant candidate surfaces a number that is the value obtained by adding up the slope weightings of cross pixels that were found by the weighting computation unit and that were contained in each of the significant candidates; and an actual surface determination unit for, when the number computed by the number measurement unit is compared with a number belonging to other significant candidate surfaces in neighboring regions that take as a standard the significant candidate surface that has this number and that thus is determined to be a maximum, identifying the significant candidate surface having the determined number as an actual surface that is a reference surface that actually exists in the image.

Alternatively, the data processing device of the present invention is a data processing device for, based on an image that is received as input, estimating the pose of an object of pose estimation with respect to a reference surface that is the reference for estimating pose, the data processing device including: a binarization unit for dividing the image into a candidate region that is a candidate for the reference surface and a background region that is a region other than the candidate region; a surface parameter formula expression unit for extracting pose parameters that indicate the pose of the object of pose estimation with respect to a reference surface that appears in the image received as input and, based on the combination of values obtained by implementing a transform by a prescribed function upon, of the pose parameters that were extracted, parameters that indicate the direction in which the object of pose estimation is directed and pose parameters other than the parameters that indicates direction, finding surface parameter formulas that are numerical formulas that express the reference surface; an all-candidate surface drawing unit for, based on the combination of all pose parameters in parameter space, which is space having, as the axes of base vectors, each of the parameters that belong to the pose parameters, drawing candidate surfaces that accord with the surface parameter formulas on the image in the parameter space; a cross determination unit for, as regards each candidate surface that was drawn by the all-candidate surface drawing unit, identifying pixels that are located on, of the candidate region, the candidate surface, and pixels that are located within a prescribed range from the candidate surface as cross pixels and finding coordinates of the cross pixels and tangent planes at the cross pixels; a weighting computation unit for, based on angles that are formed by tangent planes at the cross pixels that were found by the cross determination unit and planes that are formed by the axes of each base vector included in the parameter space, finding a slope weighting for each cross pixel that was identified by the cross determination unit; a number measurement unit for computing for each of the candidate surfaces a number that is the value obtained by adding up the slope weightings of cross pixels that were found by the weighting computation unit and that were contained in each of the candidate surfaces; and an actual surface determination unit for, based on the number computed by the number measurement unit, identifying from among candidate surfaces drawn by the all-candidate surface drawing unit an actual surface that is a reference surface that actually exists in the image.

In addition, the pose estimation system of the present invention for solving the above-described problems is a pose estimation system provided with the data processing device according to claim 1 and the data processing device according to claim 9, the pose estimation system further including a data process switching device for, based on the results of comparing a parameter space calculation amount, which is a calculation amount indicating the volume of arithmetic processing for the data processing device according to claim 1 to identify an actual surface that is the reference surface, and an image space calculation amount, which is a calculation amount indicating the volume of arithmetic processing for the data processing device according to claim 9 to identify an actual surface, selecting the data processing device according to claim 1 or the data processing device according to claim 9 and causing the selected data processing device to identify the actual surface.

In addition, the pose estimation method of the present invention for solving the above-described problems is a pose estimation method for, based on an image that is received as input, estimating the pose of an object of pose estimation with respect to a reference surface that is the reference for estimating the pose and includes: a binarization process for dividing the image into a candidate region that is a candidate for the reference surface and a background region that is a region other than the candidate region; a surface parameter formula expression process for extracting pose parameters that indicate the pose of an object of pose estimation with respect to a reference surface that appears in the image that is received as input and, based on the combination of values obtained by applying a transform by a prescribed function upon, of pose parameters that have been extracted, parameters that indicate direction in which the object of pose estimation is directed and pose parameters other than parameter that indicate direction, finding surface parameter formulas that are numerical formulas that express the reference surface; a parameter computation process for, based on pose parameters that were extracted in the surface parameter formula expression process, computing the combination of pose parameters that make up the surface parameter formulas that express all surfaces that pass through each pixel contained in the candidate region that was divided in the binarization process; a parameter surface drawing process for, based on the combination of pose parameters computed in the parameter computation process, drawing parameter surfaces that accord with the surface parameter formulas in parameter space, which is space that includes, as the axes of base vectors, each of the parameters belonging to the pose parameters; an intersection detection process for finding cross point coordinates, which are the coordinates of intersections through which pass a plurality of the parameter surfaces that were drawn in the parameter surface drawing process, and the cross surface number, which is the number of parameter surfaces that pass through the cross point coordinates; a significant candidate extraction process for, when the cross surface number at each cross point that was found in the intersection detection process is compared with the cross surface numbers at other cross point coordinates in prescribed neighboring regions that take the cross point coordinates corresponding to the cross surface number as a reference and is thus determined to be a maximum, identifying combinations of pose parameters that make up the parameter surface that corresponds to the determined cross surface number as significant candidates, which are the optimum combinations of pose parameters for expressing the reference surface; a significant candidate surface drawing process for, based on a significant candidate identified in the significant candidate extraction process and a combination of pose parameters that were computed in the parameter computation process, for which a distance to the significant candidate in the parameter space in prescribed neighboring regions that take the significant candidate as a reference is no greater than a prescribed value, drawing significant candidate surfaces on the image; a cross determination process for, regarding each significant candidate surface that was drawn in the significant candidate surface drawing process, identifying pixels that are located on, of the candidate region, the significant candidate surface, and pixels that are located within a prescribed range from the significant candidate surface as cross pixels and finding coordinates of the cross pixels and tangent planes at the cross pixels; a weighting computation process for, based on angles that are formed by tangent planes at the cross pixels that were found in the cross determination process and planes that are formed by the axes of each base vector included in the parameter space, finding a slope weighting for each cross pixel that was identified in the cross determination process; a number measurement process for computing for each of the significant candidate surfaces a number that is the value obtained by adding up the slope weightings of cross pixels that were found in the weighting computation process and that were contained in each of the significant candidates; and an actual surface determination process for, when the number computed in the number measurement process is compared with a number belonging to other significant candidate surfaces in neighboring regions that take as a standard the significant candidate surface that has this number and thus is determined to be a maximum, identifying the significant candidate surface having the determined number as an actual surface that is a reference surface that actually exists in the image.

Alternatively, the pose estimation method of the present invention is a pose estimation method for, based on an image that is received as input, estimating the pose of an object of pose estimation with respect to a reference surface that is the reference for estimating pose, the pose estimation method including: a binarization process for dividing the image into a candidate region that is a candidate for the reference surface and a background region that is a region other than the candidate region; a surface parameter formula expression process for extracting pose parameters that indicate the pose of the object of pose estimation with respect to a reference surface that appears in the image received as input and, based on the combination of values obtained by implementing a transform by a prescribed function upon, of the pose parameters that were extracted, parameters that indicate the direction in which the object of pose estimation is directed and pose parameters other than the parameters that indicate direction, finding surface parameter formulas that are numerical formulas that express the reference surface; an all-candidate surface drawing process for, based on the combination of all pose parameters in parameter space, which is space having, as the axes of base vectors, each of the parameters belonging to the pose parameters, drawing candidate surfaces that accord with the surface parameter formulas on the image in the parameter space; a cross determination process for, as regards each candidate surface that was drawn in the all-candidate surface drawing process, identifying pixels that are located on, of the candidate region, the candidate surface, and pixels that are located within a prescribed range from the candidate surface as cross pixels and finding coordinates of the cross pixels and tangent planes at the cross pixels; a weighting computation process for, based on angles that are formed by tangent planes at the cross pixels that were found in the cross determination process and planes that are formed by the axes of each base vector included in the parameter space, finding a slope weighting for each cross pixel that was identified in the cross determination process; a number measurement process for computing for each of the candidate surfaces a number that is the value obtained by adding up the slope weightings of cross pixels that were found in the weighting computation process and that were contained in each of the candidate surfaces; and an actual surface determination process for, based on the numbers computed in the number measurement process, identifying an actual surface that is a reference surface that actually exists in the image from among candidate surfaces drawn in the all-candidate surface drawing process.

In addition, the pose estimation method of the present invention includes a data process switching process for, based on the result of comparing the parameter space calculation amount, which is an amount of calculation that indicates the amount of arithmetic processing carried out using the pose estimation method described in claim 21 to identify an actual surface that is the reference surface and the image space calculation amount, which is an amount of calculation that indicates the amount of arithmetic processing carried out using the pose estimation method described in claim 29 to identify an actual surface, selecting one of the pose estimation methods, among described in claims 21 and 29 and using the selected pose estimation method to identify the actual surface.

Still further, the program according to the present invention is a record medium having recorded there on a computer-readable program for causing execution by a computer, the program causing a computer to execute: a binarization procedure for dividing an image that is received as input into a candidate region that is a candidate for a reference surface that is the reference for estimating pose and a background region that is a region other than the candidate region; a surface parameter formula expression procedure for extracting pose parameters that indicate the pose of an object of pose estimation with respect to a reference surface that appears in the image received as input and, based on a combination of values obtained by implementing a transform by a prescribed function upon, of pose parameters that were extracted, parameters that indicate the direction in which the object of pose estimation is directed and pose parameters other than the parameters that indicate direction, finding surface parameter formulas that are numerical formulas that express the reference surface; a parameter computation procedure for, based on pose parameters that were extracted in the surface parameter formula expression procedure, computing a combination of pose parameters that make up the surface parameter formulas that express all surfaces that pass through each pixel contained in the candidate region that was divided in the binarization procedure; a parameter surface drawing procedure for, based on the combination of pose parameters computed in the parameter computation procedure, drawing parameter surfaces that accord with the surface parameter formulas in parameter space, which is space that includes, as the axes of base vectors, each of the parameters belonging to the pose parameters; an intersection detection procedure for finding cross point coordinates, which are the coordinates of intersections through which pass a plurality of the parameter surfaces that were drawn in the parameter surface drawing procedure, and cross surface numbers, which are the numbers of parameter surfaces that pass through the cross point coordinates; a significant candidate extraction procedure for, when the cross surface number at each cross point that was found in the intersection detection procedure is compared with the cross surface numbers at other cross point coordinates in prescribed neighboring regions that take the cross point coordinate corresponding to the cross surface number as a reference and is thus determined to be a maximum, identifying the combination of pose parameters that make up the parameter surface that corresponds to the determined cross surface number as a significant candidate, which is the optimum combination of pose parameters for expressing the reference surface; a significant candidate surface drawing procedure for, based on a significant candidate identified in the significant candidate extraction procedure and the combination of pose parameters that were computed in the parameter computation procedure for which distance to the significant candidate in the parameter space in prescribed neighboring regions that take the significant candidate as a reference is no greater than a prescribed value, drawing significant candidate surfaces on the image; a cross determination procedure for, as regards each significant candidate surface that was drawn in the significant candidate surface drawing procedure, identifying pixels that are located on, of the candidate region, the significant candidate surface, and pixels that are located within a prescribed range from the significant candidate surface as cross pixels and finding coordinates of the cross pixels and tangent planes at the cross pixels; a weighting computation procedure for, based on angles that are formed by tangent planes at the cross pixels that were found in the cross determination procedure and planes that are formed by the axes of each base vector included in the parameter space, finding a slope weighting for each cross pixel that was identified in the cross determination procedure; a number measurement procedure for computing for each of the significant candidate surfaces a number that is a value obtained by adding up the slope weightings of cross pixels that were found in the weighting computation procedure and contained in each of the significant candidates; and an actual surface determination procedure for, when the number computed in the number measurement procedure is compared with numbers belonging to other significant candidate surfaces in neighboring regions that take as a reference the significant candidate surface that has this number and thus determined to be a maximum, identifying the significant candidate surface having the determined number as an actual surface that is a reference surface that actually exists in the image.

Alternatively, the program of the present invention is a record medium having recorded there on a computer-readable program for causing execution by a computer, the program causing a computer to execute: a binarization procedure for dividing an image received as input into a candidate region that is a candidate for the reference surface that is the reference for estimating pose and a background region that is a region other than the candidate region; a surface parameter formula expression procedure for extracting pose parameters that indicate the pose of an object of pose estimation with respect to a reference surface that appears in the image received as input and, based on a combination of values obtained by implementing a transform by a prescribed function upon, of pose parameters that were extracted, parameters that indicate the direction in which the object of pose estimation is directed and pose parameters other than the parameters that indicate direction, finding surface parameter formulas that are numerical formulas that express the reference surface; an all-candidate surface drawing procedure for, based on the combination of all pose parameters in parameter space, which is space having, as the axes of base vectors, each of the parameters belonging to the pose parameters, drawing candidate surfaces that accord with the surface parameter formulas on the image in the parameter space; a cross determination procedure for, as regards each candidate surface that was drawn in the all-candidate surface drawing procedure, identifying pixels that are located on, of the candidate region, the candidate surface, and pixels that are located within a prescribed range from the candidate surface as cross pixels and finding coordinates of the cross pixels and tangent planes at the cross pixels; a weighting computation procedure for, based on angles that are formed by tangent planes at the cross pixels that were found in the cross determination procedure and planes that are formed by the axes of each base vector included in the parameter space, finding a slope weighting for each cross pixel that was identified in the cross determination procedure; a number measurement procedure for computing for each of the candidate surfaces a number that is a value obtained by adding up the slope weightings of cross pixels that were found in the weighting computation procedure and that were contained in each of the candidate surfaces; and an actual surface determination procedure for, based on the numbers computed in the number measurement procedure, identifying from among candidate surfaces drawn in the all-candidate surface drawing procedure an actual surface that is a reference surface that actually exists in the image.

In addition, the program of the present invention is a record medium having recorded there on a computer-readable program for causing execution by a computer of: a data process switching procedure for, based on the result of comparing the parameter space calculation amount, which is a calculation amount that indicates the amount of arithmetic processing carried out by executing the program described in claim 41 to identify an actual surface that is the reference surface and the image space calculation amount, which is a calculation amount that indicates the amount of arithmetic processing carried out by executing the program described in claim 49 to identify the actual surface, selecting one of the program described in claim 41 and the program described in claim 49 and executing the selected program to identify the actual surface.

The data processing device according to the present invention is a data processing device for, based on an image that is received as input, estimating pose of an object of pose estimation with respect to a reference surface that is the reference of estimating pose, the data processing device: dividing the image into a candidate region that is a candidate of the reference surface and a background region that is the region other than the candidate region; extracting pose parameters that indicate the pose of the object of pose estimation with respect to the reference surface that appears in the image that is received as input; based on a combination of values obtained by implementing a transform by a prescribed function upon, of the pose parameters that were extracted, parameters that indicate the direction in which the object of pose estimation is directed and pose parameters other than the parameters that indicate direction, finding surface parameter formulas that are numerical formulas for expressing the reference surface; based on the pose parameters that were extracted, calculating a combination of pose parameters that make up surface parameter formulas that express all surfaces that pass through each pixel that is contained in the candidate region that was divided; based on the combination of pose parameters that were calculated, drawing parameter surfaces that accord with the surface parameter formulas in parameter space, which is space having, as the axes of base vectors, each of the parameters that belong to the pose parameters; finding the cross point coordinates that are the coordinates of intersections through which pass a plurality of parameter surfaces that were drawn and a cross surface number that is the number of parameter surfaces that pass through cross point coordinates; when the cross surface number at each cross point that was found is compared with a cross surface number at other cross point coordinates in prescribed neighboring regions that take the cross point coordinate corresponding to the cross surface number as a reference and thus determined to be a maximum, identifying, as significant candidates that are the combination of optimum pose parameters for expressing the reference surface, the combination of pose parameters that make up parameter surfaces that correspond to the cross surface number that was determined; based on the combination of the significant candidates that were identified and the pose parameters for which the distance to significant candidates in prescribed neighboring regions that take the significant candidates as a reference is no greater than a prescribed value, drawing significant candidate surfaces on the image; regarding each significant candidate surface that was drawn, identifying as cross pixels those pixels located on, of the candidate region, the significant candidate surface, and pixels located within a prescribed range from significant candidate surface; finding the coordinates of cross pixels and tangent planes at cross pixels; based on angles formed by tangent planes at cross pixels that were found and surfaces that are formed by the axes of each base vector belonging to parameter space, finding a slope weighting for each cross pixel; calculating for each significant candidate surface a number that is the value obtained by adding up the slope weightings of cross pixels that are contained in each significant candidate; and, when a number that is calculated is compared with numbers belonging to other significant candidate surfaces in neighboring regions that take as reference the significant candidate surface that has the number and that thus is determined to be a maximum, identifying the significant candidate surface having the number that was determined as an actual surface that is a reference surface that actually exists in the image.

By means of this configuration, a surface that is the reference of a pose parameter can be accurately and easily detected to realize pose estimation.

The above and other objects, features, and advantages of the present invention will become apparent from the following description with reference to the accompanying drawings which illustrate an example of the present invention.

BRIEF DESCRIPTION OF THE DRAWINGS

FIG. 11 shows an example of the data structure of the intersection list shown in FIG. 10;

EXEMPLARY EMBODIMENT

First Embodiment

Explanation first regards pose estimation system 1 (including a data processing device, pose estimation method, and program) according to the first embodiment of the present invention.

The configuration of pose estimation system 1 of the first embodiment is first explained. Pose estimation system 1 is mounted in, for example, an air vehicle or underwater vehicle that is the object of pose estimation together with image acquisition device 700 and pose control system 800 shown in FIG. 7.

Figure 1:
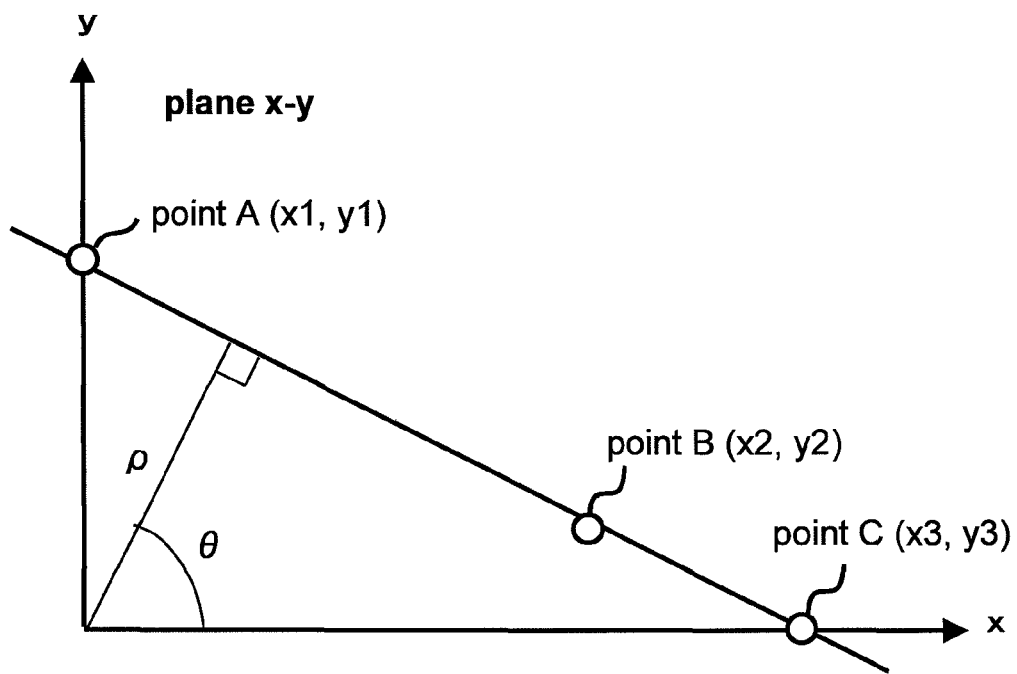
FIG. 1 shows an example of a straight line on a plane for explaining a Hough transform.
Figure 2:
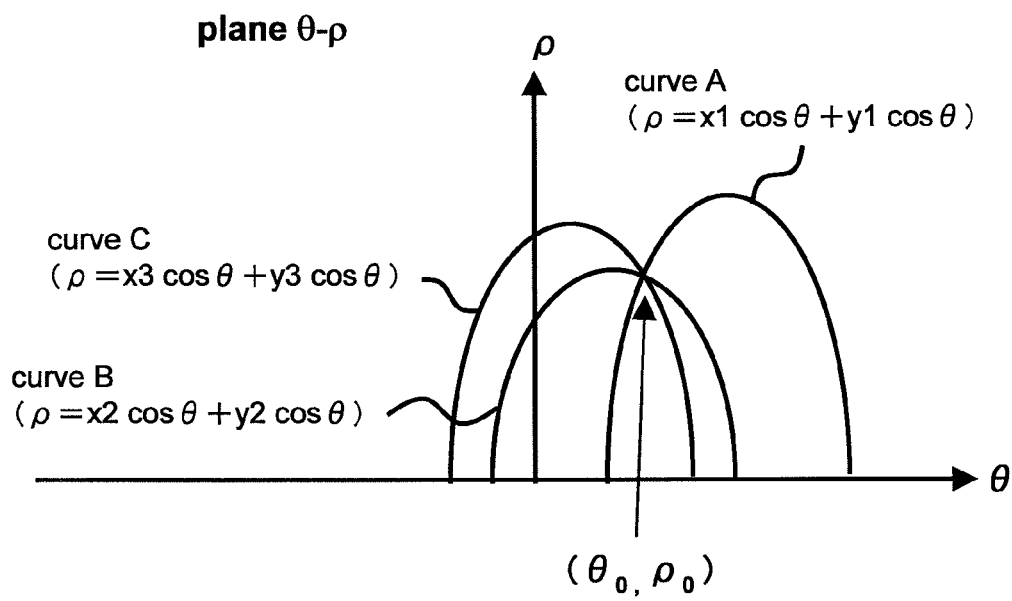
FIG. 2 shows an example of parameter lines obtained in parameter space when points are detected on a straight line.
Figure 3A:
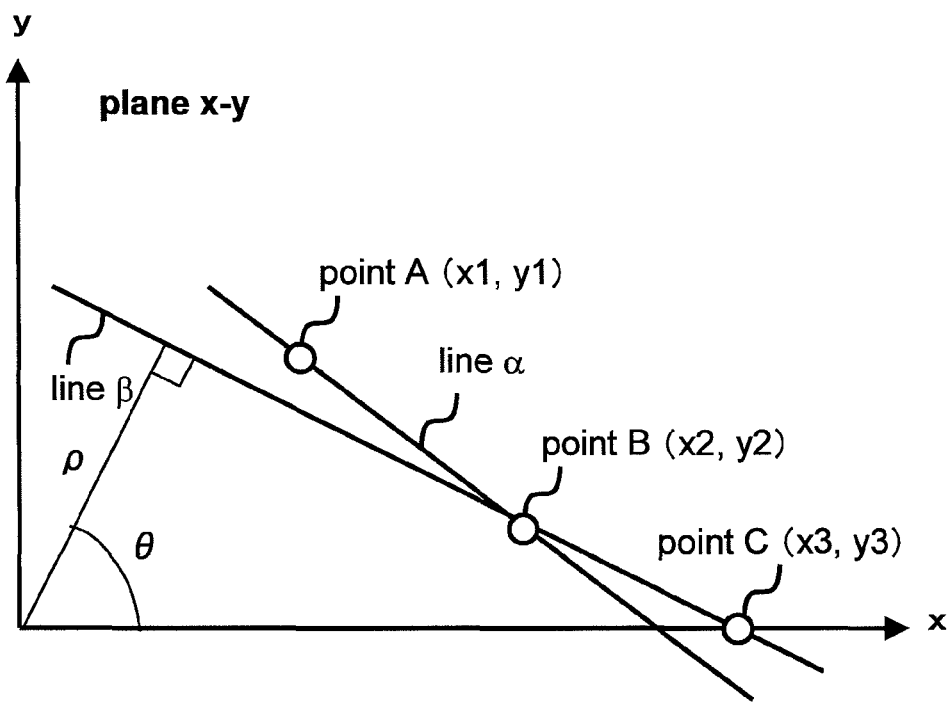
FIG. 3a shows a first example in which three points located on lines are detected on lines that are objects of detection.
Figure 3B:
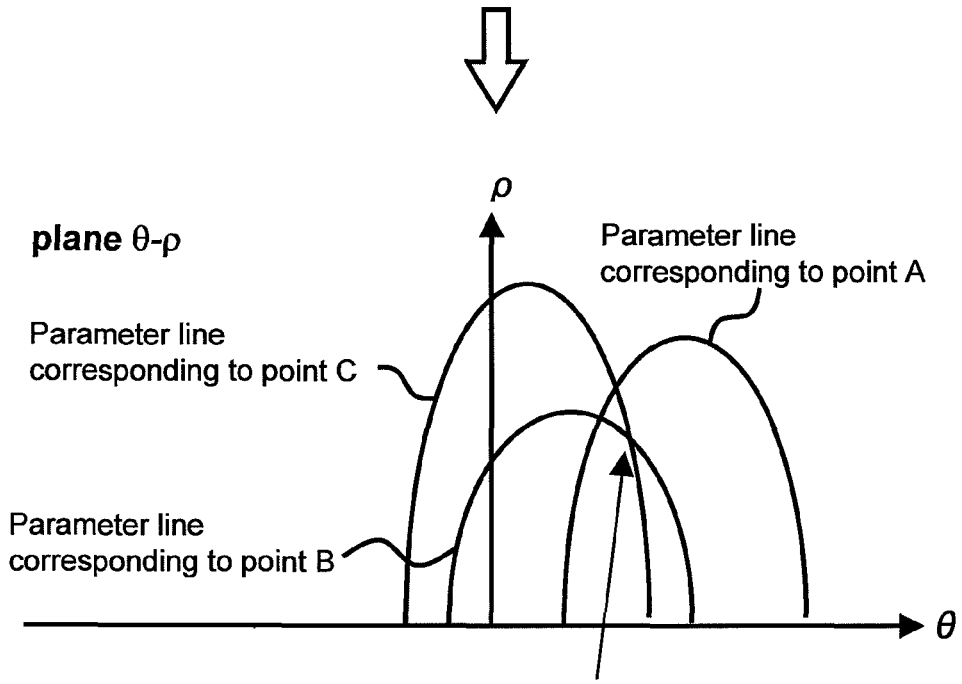
FIG. 3b shows an example in which parameter lines that correspond to each point intersect at different coordinates.
Figure 4A:
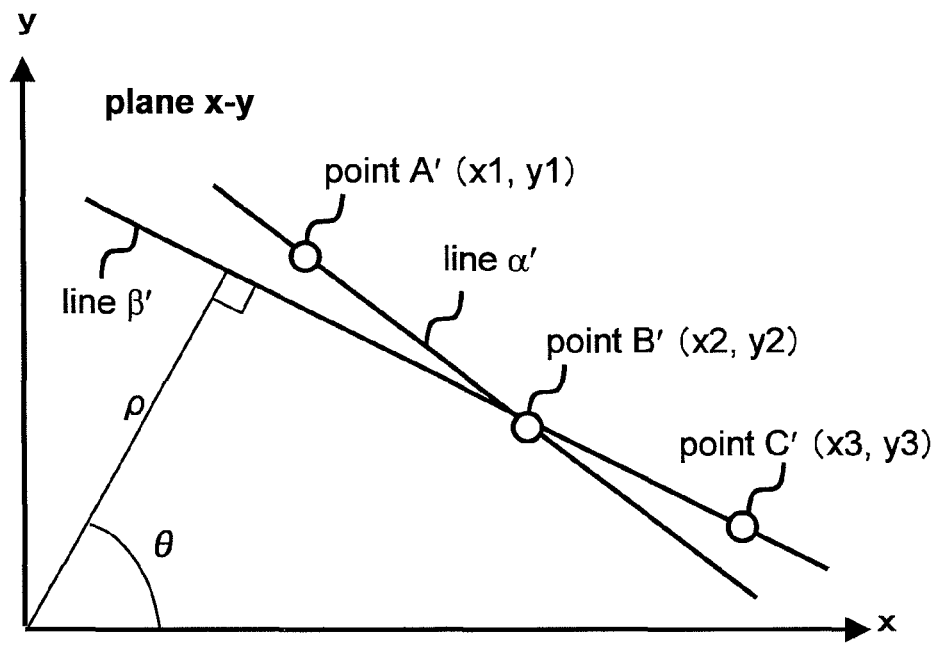
FIG. 4a shows a second example in which three points located on lines are detected on lines that are objects of detection.
Figure 4B:
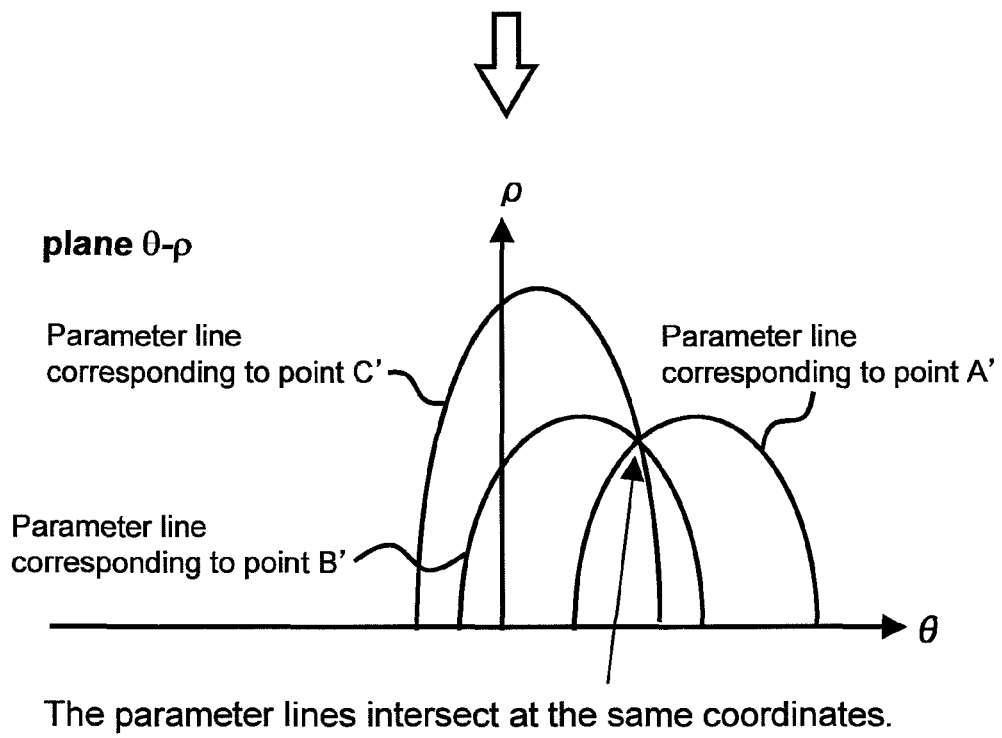
FIG. 4b shows an example in which parameter lines that correspond to each point intersect at the same coordinates.
Figure 5A:
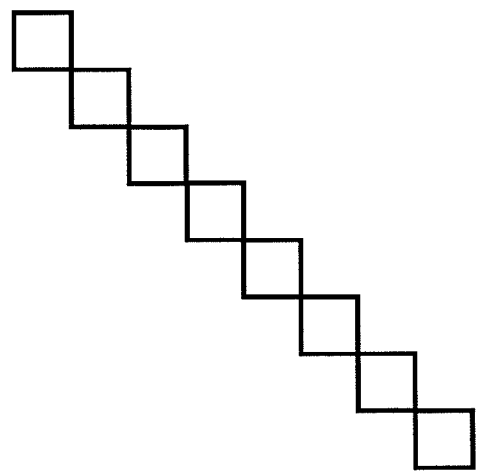
FIG. 5a shows a first example of a pixel series arranged in linear form.
Figure 5B:
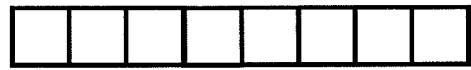
FIG. 5b shows a second example of a pixel series arranged in linear form.
Figure 6:
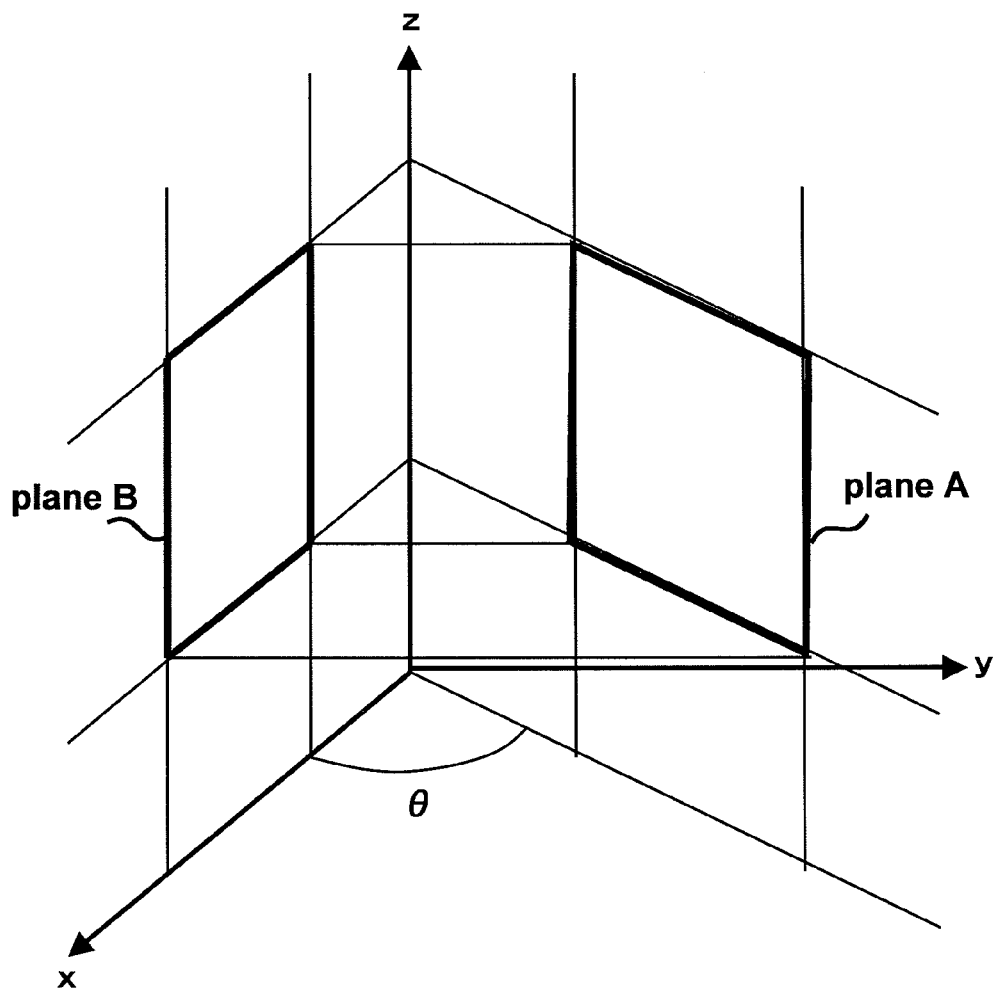
FIG. 6 shows an example in which the area of a plane is the same as the area projected on plane z-x.
Figure 7:
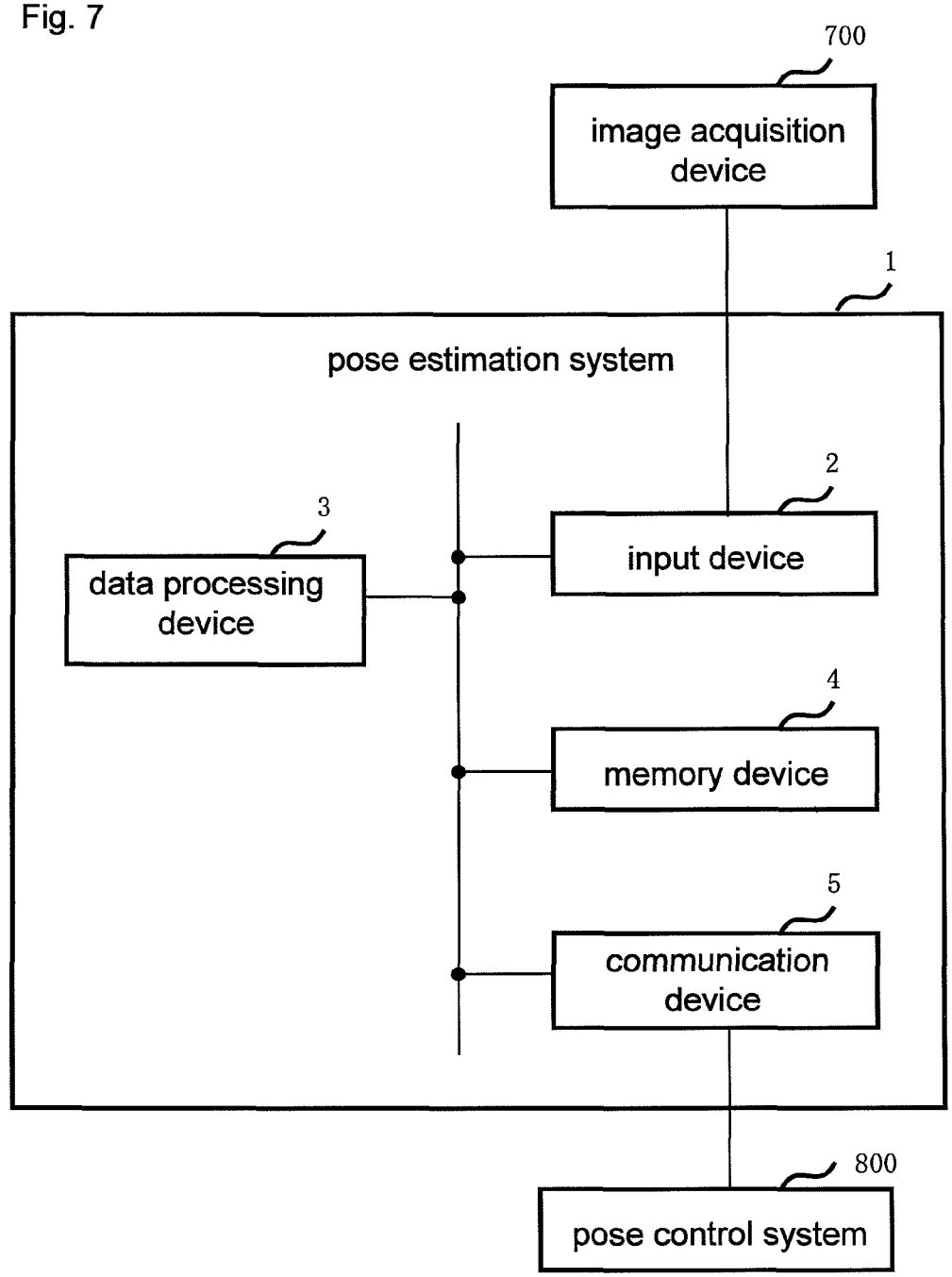
FIG. 7 shows the configuration of a pose estimation system according to the first embodiment of the present invention.

As shown in FIG. 7, pose estimation system 1 is made up from input device 2, data processing device 3, memory device 4, and communication device 5.

Input device 2 includes an image input function and a character input function. Input device 2 receives images from external image acquisition device 700 and receives the images as input. In addition, input device 2 receives character information according to the operation of the user. External image acquisition device 700 is made up from, for example, a stereo camera, a laser, a rangefinder, radar, sonar, or lidar, and acquires images by capturing and generating the image of a subject.

Data processing device 3 is made up from a prescribed information processing device that operates in accordance with program control and executes various data processing for detecting a plane or curved surface.

Memory device 4 stores various types of information. For example, memory device 4 stores a program for controlling data processing device 3, data for executing operations by data processing device 3, and the results of operation by data processing device 3.

Communication device 5 transmits pose parameters computed by data processing device 3 to external pose control system 800. Communication device 5 executes "data transmission processing," and transmits pose parameters by way of a cable or wireless network (not shown) to, for example, external pose control system 800. In addition, pose control system 800 controls the pose of the object of pose estimation in which the pose estimation system is mounted based on the pose parameters that are transmitted in from communication device 5.

Figure 8:
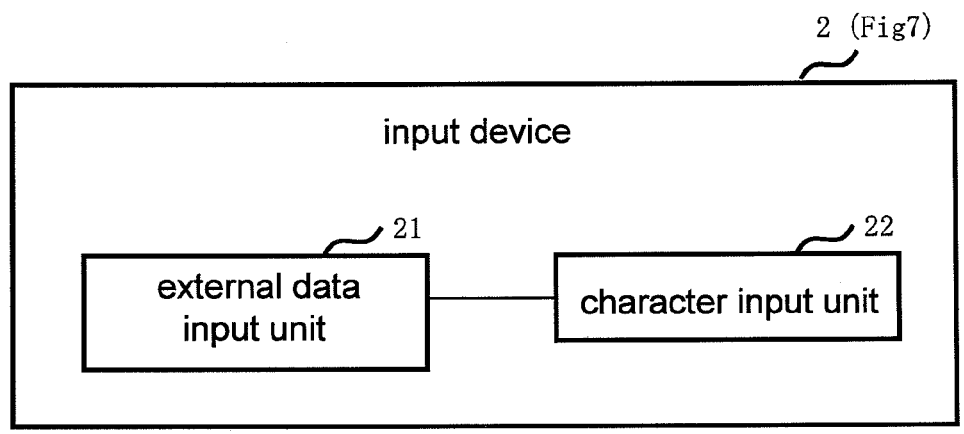
FIG. 8 shows the configuration of the input device shown in FIG. 7.

Explanation next regards the details of input device 2. As shown in FIG. 8, input device 2 includes external data input unit 21 and character input unit 22.

External data input unit 21 executes "external data input processing" and receives as input three-dimensional images received from image acquisition device 700. In this case, no particular limitations apply regarding the three-dimensional images that external data input unit 21 receives. For example, the three-dimensional image may be a still three-dimensional image or a moving three-dimensional image. In addition, the three-dimensional image may be a three-dimensional image that represents by high dimensions: a physical amount that indicates a temporal size or a spatial size such as a velocity field or a magnetic field, an image characteristic amount that is obtained by various operations such as convolution by a specific function, or temporal change of an image characteristic amount.

External data input unit 21 is not limited to direct reception by way of data lines of an image acquired by image acquisition device 700 and may receive an image from the outside by reading an image from a recording medium that records an image acquired by image acquisition device 700.

Character input unit 22 is made up from, for example, a keyboard, a mouse, or a touch-panel, and receives character information according to the manipulation of the user by the execution of "character input processing."

Figure 9:
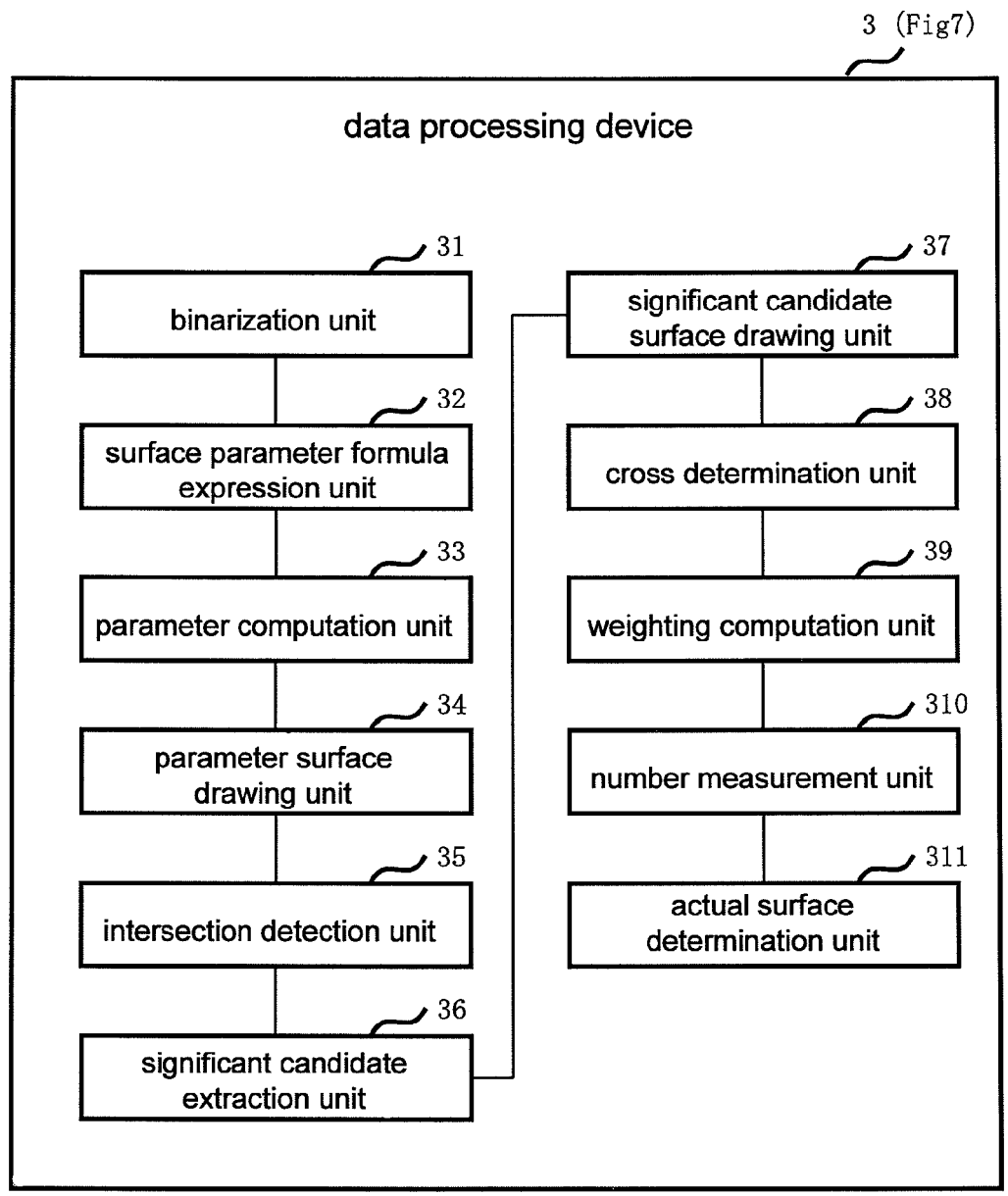
FIG. 9 shows the configuration of the data processing device shown in FIG. 7.

Explanation next regards the details of data processing device 3. As shown in FIG. 9, data processing device 3 includes: binarization unit 31, surface parameter formula expression unit 32, parameter computation unit 33, parameter surface drawing unit 34, intersection detection unit 35, significant candidate extraction unit 36, significant candidate surface drawing unit 37, cross determination unit 38, weighting computation unit 39, number measurement unit 310, and actual surface determination unit 311.

Binarization unit 31 executes a "binarization process" to divide a three-dimensional image received as input from external data input unit 21 into prescribed regions. Based on the pixel values of the three-dimensional image, binarization unit 31 divides the three-dimensional image into two regions, a "candidate region CR" that is the region that is a candidate for the "reference surface" (plane or curved surface) that is the object of detection, and "background region BR" that is a region that is not a candidate for the reference surface (a region other than candidate region CR). In addition, the three-dimensional image that is divided into two regions generated by the binarization process of binarization unit 31 is referred to as a "binarized image." Surface parameter formula expression unit 32 executes a "surface parameter formula expression process," and based on the three-dimensional image received as input by external data input unit 21, extracts "pose parameters" that indicate the pose of the object of pose estimation with respect to a plane or curved surface that appears in the three-dimensional image. Surface parameter formula expression unit 32 then subjects, of the extracted pose parameters, the parameters that indicate direction to conversion by "a prescribed function."

Here, the "object of pose estimation" is, for example, an air vehicle or a underwater vehicle. In addition, of the pose parameters, "parameters that indicate direction" are, for example, the angle of an object of pose estimation with respect to the reference plane for estimating pose, or the direction (for example, north, east, south, or west) of the object of pose estimation with respect to the reference surface. In addition, the pose parameters include, for example, the distance between the object of pose estimation and the reference surface (a plane or curved surface) that is the reference for estimating the pose of the object of pose estimation.

When the "parameters that indicate direction" are angles, a transform is executed that uses a trigonometric function as the "prescribed function." This transform is carried out to correct the length of a pixel series to the distance that is measured by Euclidean distance, as was explained in the previously described example. In the following explanation, the parameter that indicates direction is assumed to be an angle.

Surface parameter formula expression unit 32 further executes a "surface parameter formula expression process" and combines a value obtained by subjecting an angle to conversion by a trigonometric function with a pose parameter other than an angle (direction) to find a "surface parameter formula," which is a numerical expression for expressing any surface (plane or curved surface). In addition, surface parameter formula expression unit 32 saves the "surface parameter formula" that was found. Parameter computation unit 33 executes a "parameter computation process" and, at each pixel of the "candidate region CR" that was divided by binarization unit 31, computes a combination of pose parameters that satisfy formulas that express all planes or curved surfaces that can pass through these pixels based on the pose parameters that were extracted by the surface parameter formula expression unit. Parameter surface drawing unit 34 executes a "parameter surface drawing process," and using the combination of all pose parameters that were computed by parameter computation unit 33, draws "parameter surfaces" (in planar form or in the form of a curved surface) in "parameter space," which is space that includes each of the parameters (such as angle and distance) that belong to the pose parameters as the axes of base vectors.

Intersection detection unit 35 executes a "intersection detection process," and, based on the parameter surfaces drawn by parameter surface drawing unit 34, finds "cross point coordinates" and "cross surface numbers" relating to all pixels contained in candidate region CR.

Here, "cross point coordinates" refers to the coordinates of cross points (intersections) through which a plurality of parameters pass due to the intersection of a plurality of parameter surfaces in parameter space. In addition, a "cross surface number" is the number of parameter surfaces that intersect at a "cross point coordinate" and that pass through a cross point (intersection).

Significant candidate extraction unit 36 executes a "significant candidate extraction process," and extracts as "significant candidates" the combination of pose parameters that are most suitable for expressing planes and curved surfaces from among the combination of pose parameters computed by parameter computation unit 33.

The conditions for identification as a significant candidate are; that the cross surface number at cross point coordinates detected by intersection detection unit 35 be greater than a first threshold value, and moreover, that the cross surface number at cross point coordinates that are currently being determined is the largest in prescribed neighboring regions that take these cross point coordinates as a reference.

For this purpose, significant candidate extraction unit 36 compares the first threshold value with the cross surface number at the cross point coordinates that were detected by intersection detection unit 35. The first threshold value may be a value stored in threshold value memory unit 41. If, as a result of comparison, the cross surface number is greater than the first threshold value at each cross point, it is determined that the conditions for significant candidate have been met.

In addition, significant candidate extraction unit 36 further determines whether a cross surface number that has been determined to be greater than the first threshold value is the maximum in prescribed neighboring regions that take the cross point coordinates that correspond to this cross surface number as a reference. Then, when it is determined that there are no intersections within the prescribed neighboring regions that have a larger cross surface number than currently being determined (when it is determined that the cross surface number is a maximum), the combination of pose parameters that make up the parameter surface that corresponds to the cross surface number is identified as the "significant candidate" that is the combination of pose parameters most suitable for expressing a plane or curved surface. Significant candidate extraction unit 36 further, regarding the combination of pose parameters that has been identified as a significant candidate, converts "significant candidate surface bit BC," which indicates that the combination is a significant candidate, from "0" to "1." Significant candidate bit BC is registered in intersection list 421 that is stored by memory device 4 and that will be described hereinbelow.

Significant candidate surface drawing unit 37 executes a "significant candidate surface drawing process" and, based on a significant candidate that was extracted by significant candidate extraction unit 36 and the combination of pose parameters for which distance from the significant candidate in parameter space is no greater than a prescribed value in prescribed neighboring regions that take this significant candidate as a reference, draws "significant candidate surfaces" (planes or curved surfaces). Significant candidate surface drawing unit 37 draws "significant candidate surfaces" to overlie the three-dimensional image.

Cross determination unit 38 executes a "cross determination process" and, for each significant candidate surface that was drawn by significant candidate surface drawing unit 37, identifies as "cross pixels" pixels through which significant candidate surfaces pass in candidate region CR of the three-dimensional image and pixels located within a prescribed range that takes the significant candidate surface as a reference. In addition, Cross determination unit 38 finds the coordinates in parameter space at which the identified "cross pixels" are located. Cross determination unit 38 further registers the coordinates of the "cross pixels" that were found in a cross pixel list (to be described) that is stored by parameter space memory unit 42.

Cross determination unit 38 further finds tangent planes of significant candidate surfaces at cross pixels.

Weighting computation unit 39 executes a "weighting computation process." In the "weighting computation process," weighting computation unit 39 finds each of the angles formed by tangent planes that were found by cross determination unit 38 and surfaces formed by the axes belonging to parameter space (plane x-y, plane y-z, and plane z-x). In other words, weighting computation unit 39 finds the angles formed by tangent planes that were found by cross determination unit 38 and plane x-y, the angles that the tangent planes form with plane y-z, and the angle that the tangent planes form with plane z-x. Weighting computation unit 39 then finds the "minimum angle," which is the angle for which the absolute value among the angles that were found is a minimum.

Weighting computation unit 39 further finds a "slope weighting" that expresses the ratio of the length of the pixel series to the length measured by Euclidean distance for each pixel through which significant candidate surfaces pass. The "slope weighting" in this example is found by the absolute value of the reciprocal of the cosine for the minimum angle. For example, if the minimum angle that is found is the minimum angle $\theta$, the "slope weighting" is $1/|\cos \theta|$.

Number measurement unit 310 executes a "number measurement process" and finds a "number," which is the value obtained by adding up the slope weightings of all cross pixels for each significant candidate surface.

Actual surface determination unit 311 executes an "actual surface determination process" and based on the numbers found by number measurement unit 310 identifies from among the significant candidate surfaces an "actual surface," which is a surface that actually exists in the three-dimensional image.

As to the conditions for identification as an actual surface, the number found by number measurement unit 310 must be larger than a second threshold value, and further, the cross surface number at cross point coordinates that are currently being determined must be the maximum in prescribed neighboring regions that take these cross point coordinates as a reference.

To this end, actual surface determination unit 311 compares the numbers found by number measurement unit 310 with a second threshold value. The second threshold value may be a value stored by threshold value memory unit 41. If, as a result of the comparison, the number is found to be greater than the second threshold value, actual surface determination unit 311 determines that the conditions for an actual surface are satisfied.

Actual surface determination unit 311 further determines whether the number belonging to a significant candidate surface that has been determined to be greater than the second threshold value is the largest when compared with numbers belonging to other significant candidate surfaces included in neighboring regions that take the significant candidate surface having this number as a reference. Then, if it is determined that there are no significant candidate surfaces in prescribed neighboring regions larger than the number that is currently being determined (if it is determined that the number is the maximum), a significant candidate surface having this number is identified as an "actual surface" that actually exists in the three-dimensional image. Actual surface determination unit 311 further, for the significant candidate surface (combination of pose parameters) that has been identified as an actual surface, converts the "actual surface bit BR" that indicates a significant candidate from "0" to "1." The significant candidate surface bit BR is further registered in intersection list 421 (to be described) that is stored by memory device 4.

Actual surface determination unit 311 further supplies the pose parameters that make up the actual surface that has been identified to external pose control system 800 by way of communication device 5.

Figure 10:
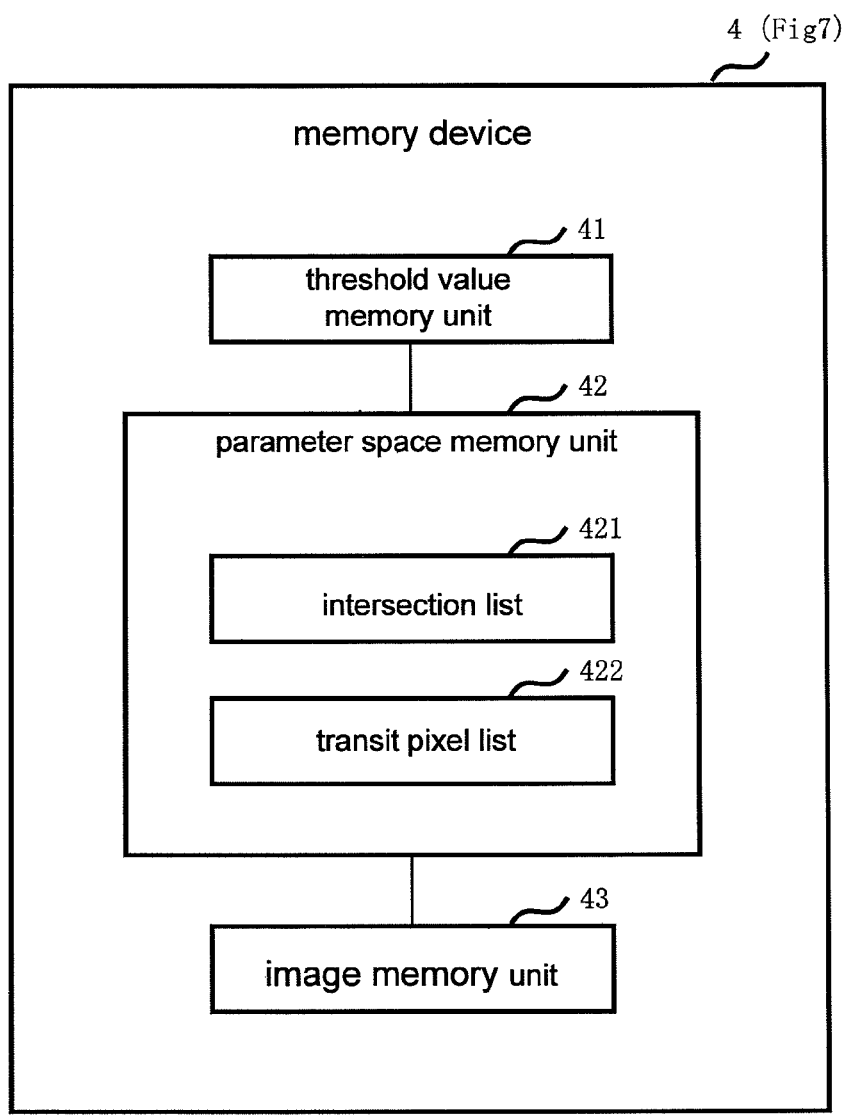
FIG. 10 shows the configuration of the memory device shown in FIG. 7.

Explanation next regards the details of memory device 4. As shown in FIG. 10, memory device 4 includes threshold value memory unit 41, parameter space memory unit 42, and image memory unit 43.

Threshold value memory unit 41 executes a "threshold value storage process" and stores various threshold values that have been received as input from character input unit 22. Threshold value memory unit 41 stores, for example, the above-described first threshold value, the range of values, and the discretization width of each axis of parameter space that is set in advance.

Parameter space memory unit 42 executes a "parameter space storage process" and stores, for example, lists of detection candidate surfaces or parameter space used with threshold value memory unit 41 when detecting surfaces.

Parameter space memory unit 42 stores, for example, "intersection list 421" in which are registered cross points (intersections) located at the cross point coordinates that were detected by intersection detection unit 35.

As shown in FIG. 11, intersection list 421 places in association the combination of pose parameters, significant candidate surface bit BC, and actual surface bit BR. Significant candidate surface bit BC indicates that the corresponding combination of pose parameters is a significant candidate when its value is set to "1." In addition, actual surface bit BR indicates that the corresponding combination of pose parameters makes up an actual surface when its value is set to "1."

In addition, parameter space memory unit 42 stores, for example, "cross pixel list 422" that registers the coordinates of cross pixels. Parameter space memory unit 42 further stores "slope weightings" that are found by weighting computation unit 39.

Image memory unit 43 executes an "image storage process" and stores, for example, the input image that is received as input from external data input unit 21 and the images during processing or the images that result from processing by each of the constituent elements of data processing device 3.

Explanation next regards the pose estimation operations that are carried out in pose estimation system 1 of the first embodiment that has the above-described configuration.

Figure 12:
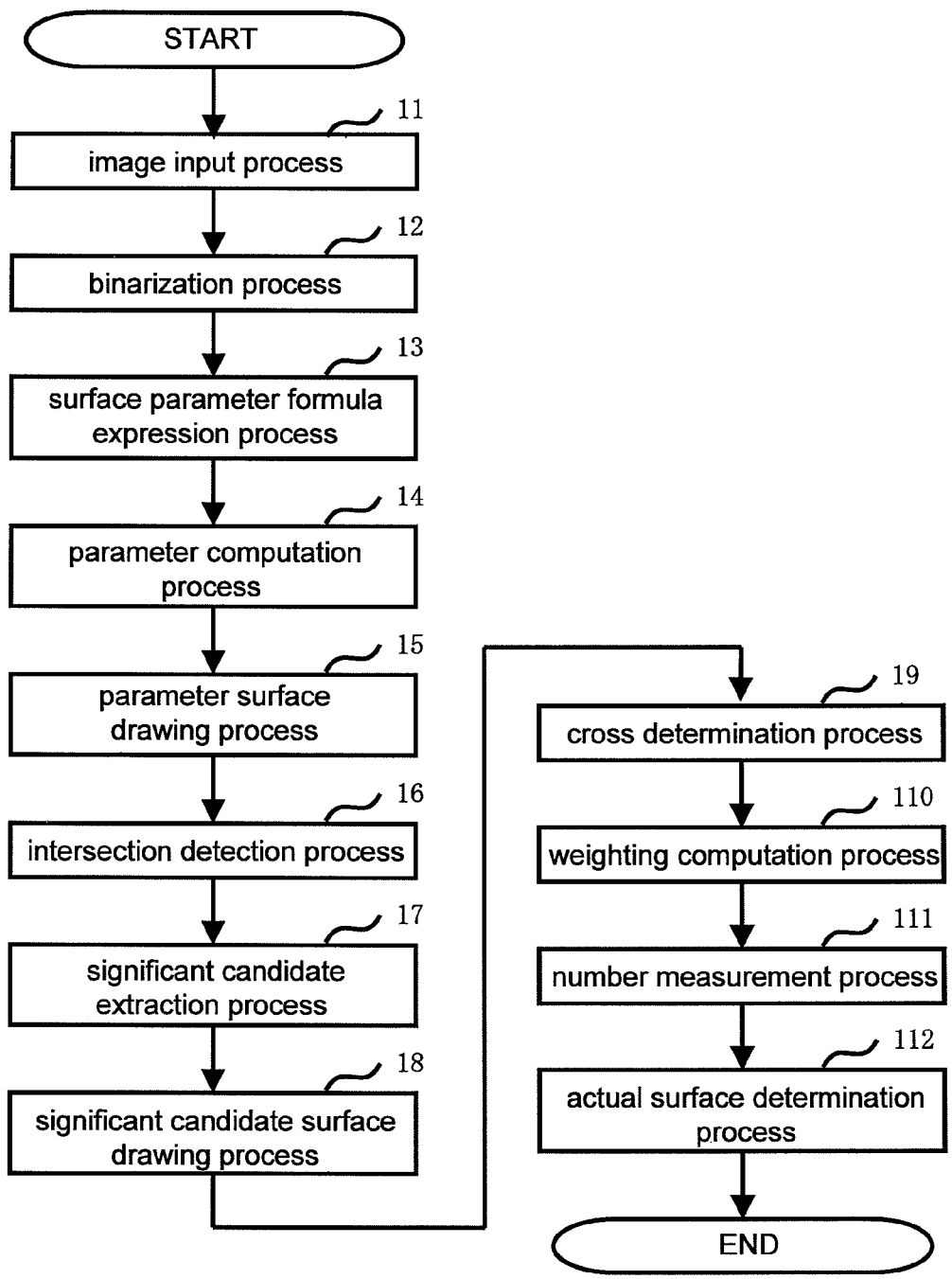
FIG. 12 is a flow chart showing the operations for identifying an actual surface.

As shown in FIG. 12, external data input unit 21 of input device 2 receives a three-dimensional image by means of the "external data input process" of Step 11. Image memory unit 43 stores the three-dimensional image that is received as input.

By means of the "binarization process" of Step 12, binarization unit 31 refers to image memory unit 43 and, based on the pixel values of the three-dimensional image, divides the three-dimensional image into two regions: a region that is a candidate for the planes or curved surfaces that are the objects of detection (candidate region CR) and a region other than the candidate region CR (background region BR). In this way, binarization unit 31 generates a binarized image.

The method by which binarization unit 31 divides a three-dimensional image into two regions is the same as a typical method for dividing an image (two-dimensional image) into two regions. There are many typical methods for binarization of an image that divides an image into two regions.

For example, a P-tile method may be applied in which a prescribed ratio of a candidate region to the number of all pixels is determined as a threshold value in advance and saved in threshold value memory unit 41, and the three-dimensional image then subjected to binarization in accordance with this threshold value.

Alternatively, a mode method may be employed in which, for example, a histogram is created with the horizontal axis as pixel values and the vertical axis as frequency, and, assuming the histogram has a double-peak form, binarization is carried out with the valley as the threshold value. Still further, a discriminant-analysis method may be applied in which, for example, binarization is carried out by determining a threshold value such that the dispersion of pixel values in each of candidate region CR and background region BR is a minimum, and moreover, the dispersion between candidate region CR and background region BR is increased. Further, a fixed threshold value method may be applied in which, for example, a threshold value of pixel values is determined in advance and saved in threshold value memory unit 41, and the image then subjected to binarization based on whether a pixel value is greater than this threshold value. Finally, a dynamic threshold value method may be applied in which, for example, the image is divided into small regions of a prescribed size, and the P-tile method, mode method, or discriminant-analysis method then used for each small region.

Image memory unit 43 executes an image storage process and stores the binarized image generated by binarization unit 31.

Surface parameter formula expression unit 32 executes the "surface parameter formula expression process" of Step 13, and finds "surface parameter formulas" that are numerical formulas indicating surfaces in the three-dimensional image. An actual surface parameter formula that is calculated by surface parameter formula expression unit 32 in this "surface parameter formula expression process" is next described.

Figure 13:
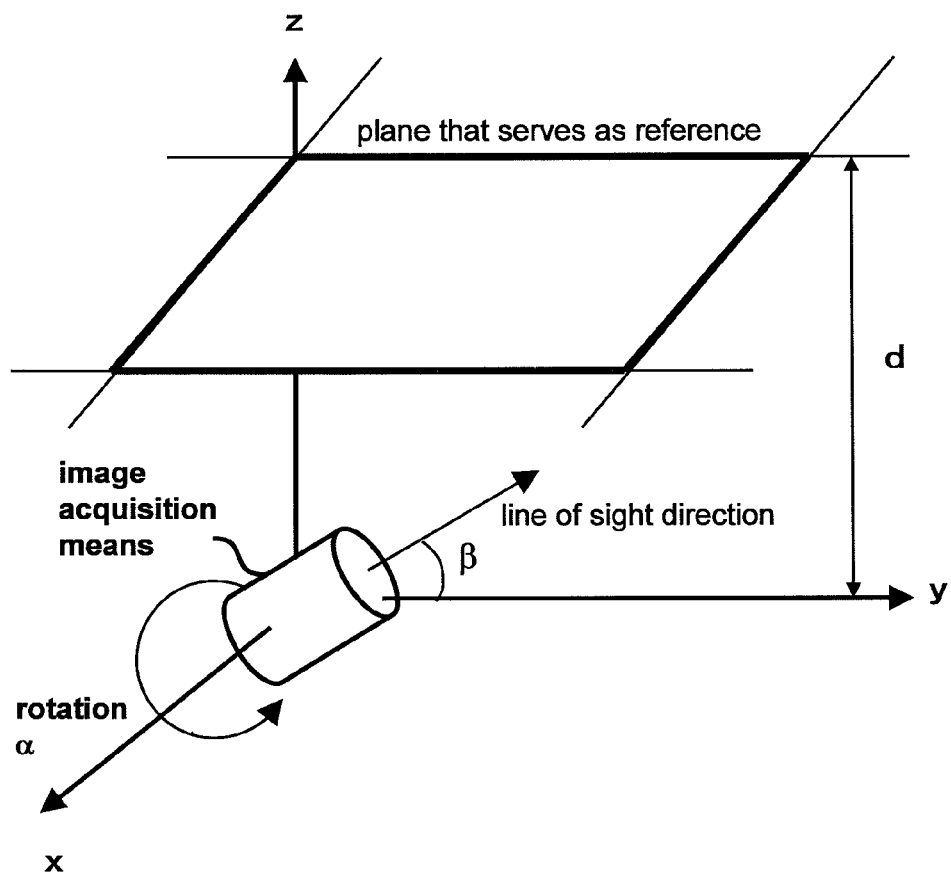
FIG. 13 shows an example of the pose and positional relation of an air vehicle or underwater vehicle with respect to a plane that is a reference.

For example, a case is considered in which, as shown in FIG. 13: the "reference surface" that is the surface taken as a reference is a plane; roll, which is the rotation angle that takes as its axis the "direction of the line of sight (for example, the direction of the optical axis of the image-capture lens)" when image acquisition of device 700 (image acquisition means) captures an image, is α toward the right; pitch, which is the angle formed by the direction of the line of sight of image acquisition device 700 (image acquisition means) with respect to the plane, is pitch β; the plane that is the reference surface is positioned above image acquisition device 700 (image acquisition means); and the distance between the plane and image acquisition device 700 is distance d. This case corresponds to, for example, estimating the pose of a craft that travels through water at a depth d that corresponds to distance d based on the ocean surface that corresponds to a reference surface that is positioned above. In this example, the projection onto plane x-y of the direction of the line of sight of the image acquisition unit is assumed to match the y-axis.

If the position of image acquisition device 700 is taken as the origin in this state, when viewed from a coordinate system that is fixed at image acquisition device 700 that takes the direction of the line of sight as the y'-axis, the horizontal direction of image acquisition device 700 as the x'-axis, and the vertical direction as the z'-axis, the conversion of the coordinate system is represented by the following formula 1:

[Formula 1]

$$\begin{pmatrix} x' \\ y' \\ z' \end{pmatrix} = \begin{pmatrix} \cos\alpha & 0 & -\sin\alpha \\ \sin\alpha\sin\beta & \cos\beta & \cos\alpha\sin\beta \\ \sin\beta\cos\beta & -\sin\beta & \cos\alpha\cos\beta \end{pmatrix} \begin{pmatrix} x \\ y \\ z \end{pmatrix} \quad \text{(Formula 1)}$$

In addition, the plane that is taken as the reference surface is represented by the following formula 2:

[Formula 2]

$$d = -x'\sin\alpha + y'\cos\alpha\sin\beta + z'\cos\alpha\cos\beta \quad \text{(Formula 2)}$$

Surface parameter formula expression unit 32 subjects the three-dimensional image to a Hough transform that takes the above-described α, β, and distance d as the axes of parameter space. On the other hand, a case may be considered in which the reference surface is a sphere. In this case, it is useful to seek the pose parameters with the center coordinate of the spherical surface as the base point, similar to a case of estimating the pose of a flying craft on a satellite orbit.

Figure 14:
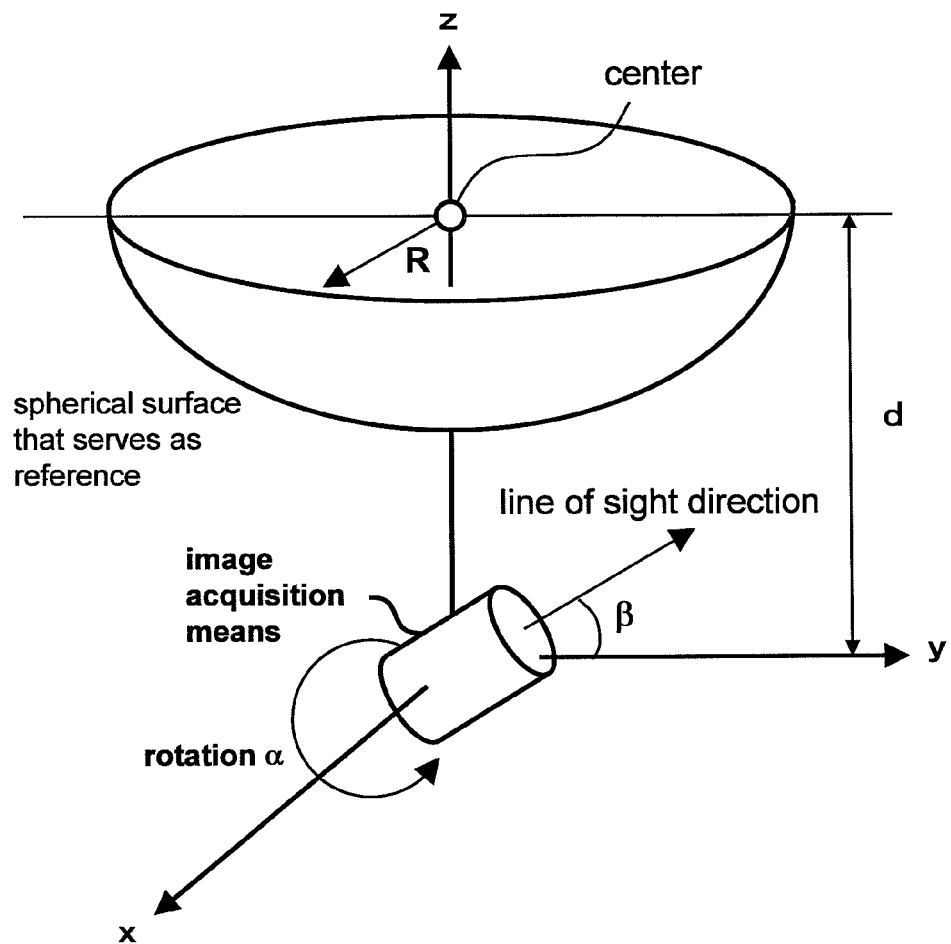
FIG. 14 shows an example of the pose and positional relation of an air vehicle or underwater vehicle with respect to a spherical surface that is a reference.

As a result, a spherical surface is assumed to be positioned vertically above or vertically below a flying craft that is the object of pose estimation as shown in FIG. 14. When the center of the spherical surface is positioned a distance d as measured from above the air vehicle and the radius of the spherical surface is known to be R, the relation that represents the spherical surface in a coordinate system that takes as axes the x-direction, y-direction, and z-direction in which roll and pitch are both "0" is represented by the following Formula 3:

[Formula 3]

$$x^2+y^2+(z-d)^2=R^2 \quad \text{(Formula 3)}$$

In addition, in a coordinate system that takes as axes x', y' and z' in which roll is α and pitch is β, a spherical surface is represented by the following Formula 4 that uses Formula 1:

[Formula 4]

$$d=(y' \sin\beta + z' \cos\beta)\cos\alpha - x'\sin\alpha \pm \sqrt{R^2-A} \quad \text{(Formula 4)}$$

Here, A in Formula 4 is defined by the following Formula 5:

[Formula 5]

$$A = y'^2(\sin^2\alpha \cdot \sin^2\beta + \cos^2\beta) - \\ 2y'z'\cos^2\alpha \sin\beta \cos\beta + z'^2(\sin^2\alpha \cdot \cos^2\beta + \sin^2\beta) - \\ 2x'y'\sin\alpha\cos\beta\sin\phi + 2z'x'\sin\alpha\cos\alpha\cos\beta \quad \text{(Formula 5)}$$

Surface parameter formula expression unit 32 subjects the three-dimensional image to a Hough transform that takes this α, β, and d as the axes of parameter space. Parameter computation unit 33 executes the "parameter computation process" of Step 14 and, at each pixel included in the "candidate region" of the three-dimensional image, computes the combination of parameters of surface parameter formulas (equations) that represent all planes and curved surfaces that can pass through these pixels.

For example, in the case of the plane shown in formula 2, α and β are subjected to discretization by a width that has been provided in advance, and distance d is then found from the relation of formula 2 for each combination of α and β within a range that has been provided in advance. For example, if the coordinates of pixels of a candidate region that is in a three-dimensional image are $(x_0, y_0, z_0)$, distance d is found by the following formula 6:

[Formula 6]

$$d=-x_0 \sin\alpha + y_0 \cos\alpha \sin\beta + z_0 \cos\alpha \cos\beta \quad \text{(Formula 6)}$$

In the case of the spherical surface shown in Formula 4, α and β are subjected to discretization by a width that is provided in advance, and distance d is found from the relation of Formula 4 for each combination of α and β in a range that is provided in advance. For example, if the coordinates at which a pixel included in candidate region CR in a three-dimensional image are $(x_0, y_0, z_0)$, distance d is represented by the following Formula 7:

[Formula 7]

$$d=(y_0 \sin\beta + z_0 \cos\beta)\cos\alpha - x_0 \sin\alpha \pm \sqrt{R^2-B} \quad \text{(Formula 7)}$$

In this case, "B" in Formula 7 is found by the following Formula 8:

[Formula 8]

$$B = y_0^2(\sin^2\alpha \cdot \sin^2\beta + \cos^2\beta) - \\ 2y_0z_0\cos^2\alpha \sin\beta \cos\beta + z_0^2(\sin^2\alpha \cdot \cos^2\beta + \sin^2\beta) - \\ 2x_0y_0\sin\alpha\cos\beta\sin\phi + 2z_0x_0\sin\alpha\cos\alpha\cos\beta \quad \text{(Formula 8)}$$

By means of the "parameter computation process" of Step 14, parameter computation unit 33 finds the set of parameters that express all surfaces that can pass through all pixels contained in candidate region CR. Parameter space memory unit 42 executes a "parameter space storage process" and stores the set of all parameters that were found by parameter computation unit 33. A surface that is formed in parameter space by the set of parameter sets that express all surfaces that can pass through a single pixel is hereinbelow referred to as a "parameter surface."

Parameter surface drawing unit 34 executes the "parameter surface drawing process" of Step 15, and for example, saves the parameter space for drawing parameter surfaces in parameter space memory unit 42 and draws the set of all possible parameters. Threshold value memory unit 41 stores the discretization width and range of values of each axis of parameter space that have been set in advance by means of a "threshold value storage process."

As the parameter surface drawing method, for example, values put at elements at which nothing is drawn are set to "0" and values are increased by "1" at a time for elements at which parameter surfaces that are drawn match coordinates in parameter space. The value of increase is not limited to "1" and may be any value as long as it is fixed. The shape that is formed by elements obtained by increasing the values in this way is a "parameter surface." One parameter surface is thus generated for each pixel in candidate region CR. Conversely, the values of elements may be reduced and focus then placed on the reduced elements.

Intersection detection unit 35 executes the "intersection detection process" of Step 16, refers to, for example, parameter space, and reads the values of each combination of pose parameters. When the number of times a read value crosses is "2" or more, the point is an intersection at which parameter surfaces intersect. Intersection detection unit 35 therefore registers all of the read values (cross surface numbers) and coordinates in parameter space (cross point coordinates) in intersection list 421. Parameter space memory unit 42 further stores intersection list 421 that is registered by intersection detection unit 35.

Significant candidate extraction unit 36 executes the "significant candidate extraction process" of Step 17 and extracts significant candidates. For example, of the intersections that are registered in intersection list 421, parameter combinations for which the cross surface number is greater than a first threshold value, and moreover, for which the cross surface number is a maximum in prescribed neighboring regions are identified as significant candidates and the "significant candidate surface bit BC" is changed from "0" to "1."

Significant candidate surface bit BC is initialized to "0" at the time intersection list 421 is generated. Alternatively, the significant candidate surface bit may be set to "1" when intersection list 421 is generated and changed to "0" when determined to be a significant candidate surface. The value that is set to the significant candidate surface bit is not limited to "0" or "1" and may be any other numerical value. When performing such operations as the determination of whether the cross surface number at the cross point coordinates that are currently being determined is a maximum or not or the recognition of the size of regions that are set as neighboring regions, various values that are stored in threshold value memory unit 41 are consulted.

In a typical Hough transform, cases occur in which, in neighboring regions that take a prescribed surface as a reference, many surfaces are detected that have a shape that resembles the prescribed surface. However, according to pose estimation system 1 of the present invention, significant candidate extraction unit 36 searches for other cross points at which the cross surface number is a maximum in neighboring regions, whereby the concentrated detection of a plurality of similar surface can be controlled.

Significant candidate surface drawing unit 37 executes the "significant candidate surface drawing process" of Step 18 and draws significant candidate surfaces. Significant candidate surface drawing unit 37 draws "significant candidate surfaces" to cross the three-dimensional image based on, of intersection list 421, combinations of parameters that are identified as significant candidate surfaces by the setting of the significant candidate surface bit to "1."

As an example of the drawing method of a significant candidate surface, image regions having a size identical to that of the three-dimensional image are saved in image memory unit 43 as significant candidate surface images, all pixel values are made "0," and values are set to "1" for all pixels for which coordinates match with the surface that is drawn from the formulas of a plane or curved surface. In addition, values may be changed to enable discernment for each significant candidate surface.

Alternatively, drawing may be on a binarized image rather than on a significant candidate surface image. When a significant candidate surface is drawn on a binarized image, the pixel values of the significant candidate surface are set to values that differ from the pixel values of the candidate region CR, and moreover, that also differ from pixel values of the background region BR.

Cross determination unit 38 executes the "cross determination process" of Step 19, refers to the significant candidate surface drawn by significant candidate surface drawing unit 37 and identifies the pixels that make up significant candidate surfaces (for example, pixels for which the pixel value is "1") as "cross pixels."

Cross determination unit 38 then finds tangent planes for the significant candidate surface at the positions of "cross pixels (pixels of interest)" that have been identified and the normals to these tangent planes. Relating to the direction of the normal that is found, the coordinates are found of a plurality of pixels for which the distance from the significant candidate surface is no greater than a prescribed value that is stored in threshold value memory unit 41. If any one of the pixels on the binarized image that are located at the same relative position (same coordinates) as each of the pixels that were found is included in candidate region CR, this pixel is identified as a "cross pixel." Parameter space memory unit 42 stores the coordinates of all cross pixels that are identified by cross determination unit 38 in cross pixel list 422.

The method by which cross determination unit 38 identifies cross pixels is not limited to a method based on the normal direction in coordinates of cross pixels, and determination may also be realized depending on whether a candidate region CR on a binarized image is contained in a neighboring region made up of pixels (L×M×N pixels) in which the number of pixels in the x-direction is L, the number of pixels in the y-direction is M, and the number of pixels in the z-direction that take cross pixels as center is N. At this time, each of pixel numbers L, M, and N may be set in advance in threshold value memory unit 41.

Weighting computation unit 39 executes the "weighting computation process" of Step 110. In the "weighting computation process," weighting computation unit 39 finds the angles that a tangent plane found by cross determination unit 38 form with plane x-y, plane y-z, and plane z-x. Weighting computation unit 39 then determines the angle having the smallest absolute value of each of the angles that were found as the minimum angle, and then finds the "slope weighting," which is the absolute value of the reciprocal of the cosine of the minimum angle that was determined. For example, if there is a minimum angle θ, the "slope weighting" is 1/|cos θ|. As a result, if the minimum angle θ is 45°, the slope weighting is found as approximately 1.41.

Weighting computation unit 39 calculates each "slope weighting" for all cross pixels that are contained in each significant candidate surface that is drawn by significant candidate surface drawing unit 37. Parameter space memory unit 42 stores the "slope weightings" that were found by weighting computation unit 39.

Number measurement unit 310 executes the "number measurement process" of Step 111 and adds up the slope weightings for each cross pixel located on each significant candidate surface. Parameter space memory unit 42 stores the results found by number measurement unit 310.

By means of the "actual surface determination process" of Step 112, actual surface determination unit 311 distinguishes the significant candidate surface for which the "number," which is the value obtained by adding up slope weightings calculated by weighting computation unit 39, is larger than the second threshold value, and moreover, wherein this number is the greatest in prescribed neighboring regions, as the significant candidate surface that is an actual surface from among the significant candidate surfaces that were drawn by significant candidate surface drawing unit 37. Actual surface determination unit 311 further changes "actual surface bit BR" that is registered in intersection list 421 from "0" to "1" for the significant candidate surface that was identified as an actual surface. Actual surface bit BR is initialized to "0" when intersection list 421 is generated. In addition, when intersection list 421 is generated, actual surface bit BR may also be set to "1" and changed to "0" upon determining an actual surface. Still further, the value set to actual surface bit BR is not limited to "0" or "1" and may be set to any other numerical value. Regarding the size of the neighboring regions that are used when determining whether a number is a maximum, reference is made to values stored by threshold value memory unit 41. Still further, actual surface determination unit 311 can suppress the concentrated detection of a plurality of similar actual surfaces by searching for other cross points for which the "number" is a maximum in neighboring regions that take the actual surface as a reference.

In addition, actual surface determination unit 311 uses communication device 5 to transmit by way of a cable or wireless network to external pose control system 800 each pose parameter registered in intersection list 421 that is stored by parameter space memory unit 42.

Image memory unit 43 executes an "image storage process" and stores a binarized image or a three-dimensional image in which surfaces are drawn. When the user instructs, an image may be displayed by, for example, a display, a projector, or a printer.

Second Embodiment

Explanation next regards the details of the second embodiment of the present invention. The pose estimation system of the second embodiment has a configuration that is fundamentally identical to that of the example shown in FIG. 7.

However, the configuration of data processing device 3a differs in the second embodiment. Explanation next regards data processing device 3a.

Figure 15:
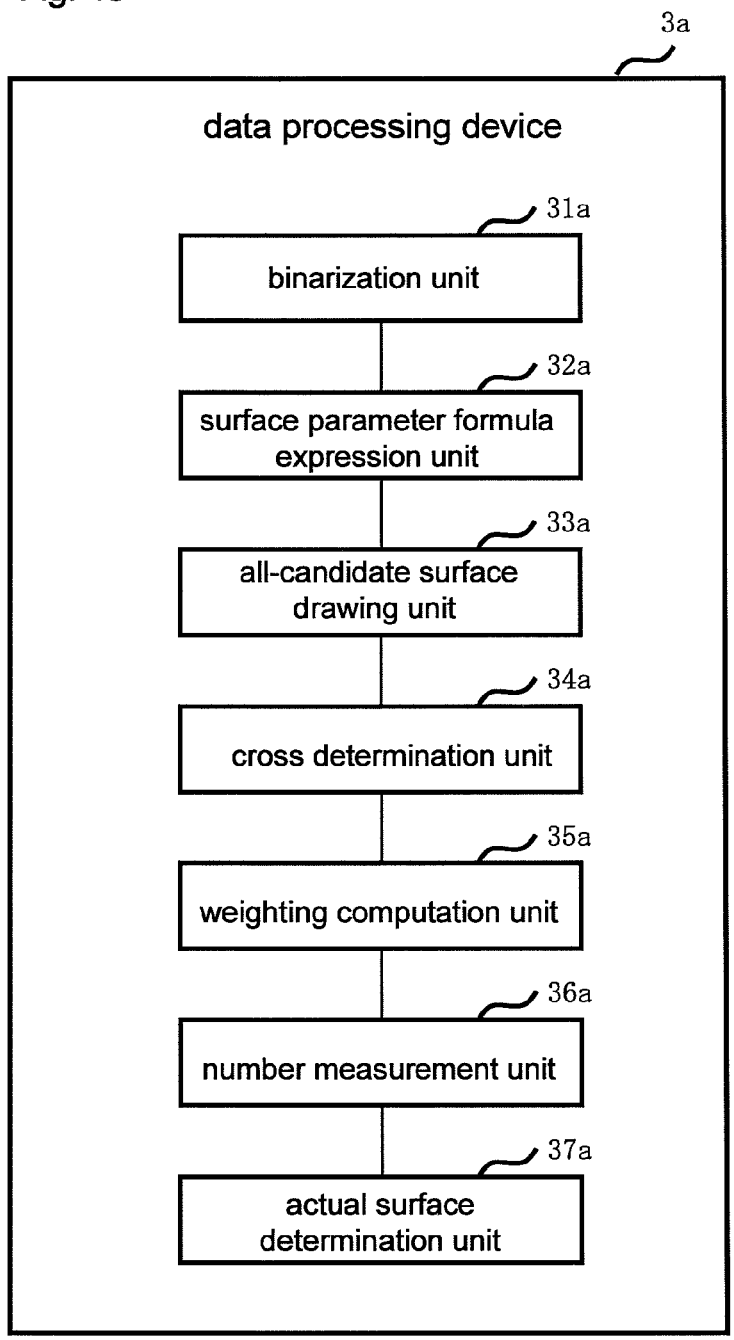
FIG. 15 shows the configuration of a data processing device in the second embodiment.

As shown in FIG. 15, data processing device 3a of the second embodiment is provided with: binarization unit 31a, surface parameter formula expression unit 32a, all-candidate surface drawing unit 33a, cross determination unit 34a, weighting computation unit 35a, number measurement unit 36a, and actual surface determination unit 37a.

The functions realized by binarization unit 31a and surface parameter formula expression unit 32a are identical to those of the corresponding constituent elements of the first embodiment.

All-candidate surface drawing unit 33a executes an "all-candidate surface drawing process," and, for all parameter combinations in parameter space that takes as axes the parameters of formulas that expresses the surfaces on an image, draws planes or curved surfaces in the image in accordance with these parameters. All-candidate surface drawing unit 33a differs from significant candidate surface drawing unit 37 of the first embodiment in that it draws planes and curved surfaces for all parameters instead of for specific parameter combinations. However, all-candidate surface drawing unit 33a is identical to significant candidate surface drawing unit 37 of the first embodiment regarding, for example, the methods for drawing these other surfaces.

The configurations and functions of cross determination unit 34a, weighting computation unit 35a, number measurement unit 36a, and actual surface determination unit 37a are identical to the corresponding constituent elements of the first embodiment. However, cross determination unit 34a, weighting computation unit 35a, number measurement unit 36a, and actual surface determination unit 37a of the second embodiment take as the object of processing surfaces that are drawn by all-candidate surface drawing unit 33a.

The difference between the first embodiment and the second embodiment is the difference in the calculation amount of data processing device 3 and the calculation amount of data processing device 3a.

The number of pose parameter combinations increases to the extent that the discretization width decreases. As a result, the amount of calculation in data processing device 3a of the second embodiment is greater than the amount of calculation in the first embodiment. In contrast, as the discretization width increases, the amount of image space calculation that data processing device 3a must compute becomes less than the amount of calculation of data processing device 3.

In addition, decrease of the proportion of candidate region CR following binarization with respect to the entire three-dimensional image efficiently limits parameter space and reduces the amount of calculation in the first embodiment. In contrast, increase in the proportion of candidate region CR with respect to the entire three-dimensional image necessitates calculation relating to the drawing of parameter surfaces in the first embodiment that is not carried out in the second embodiment. As a result, the amount of calculation may increase in the first embodiment.

Third Embodiment

Figure 16:
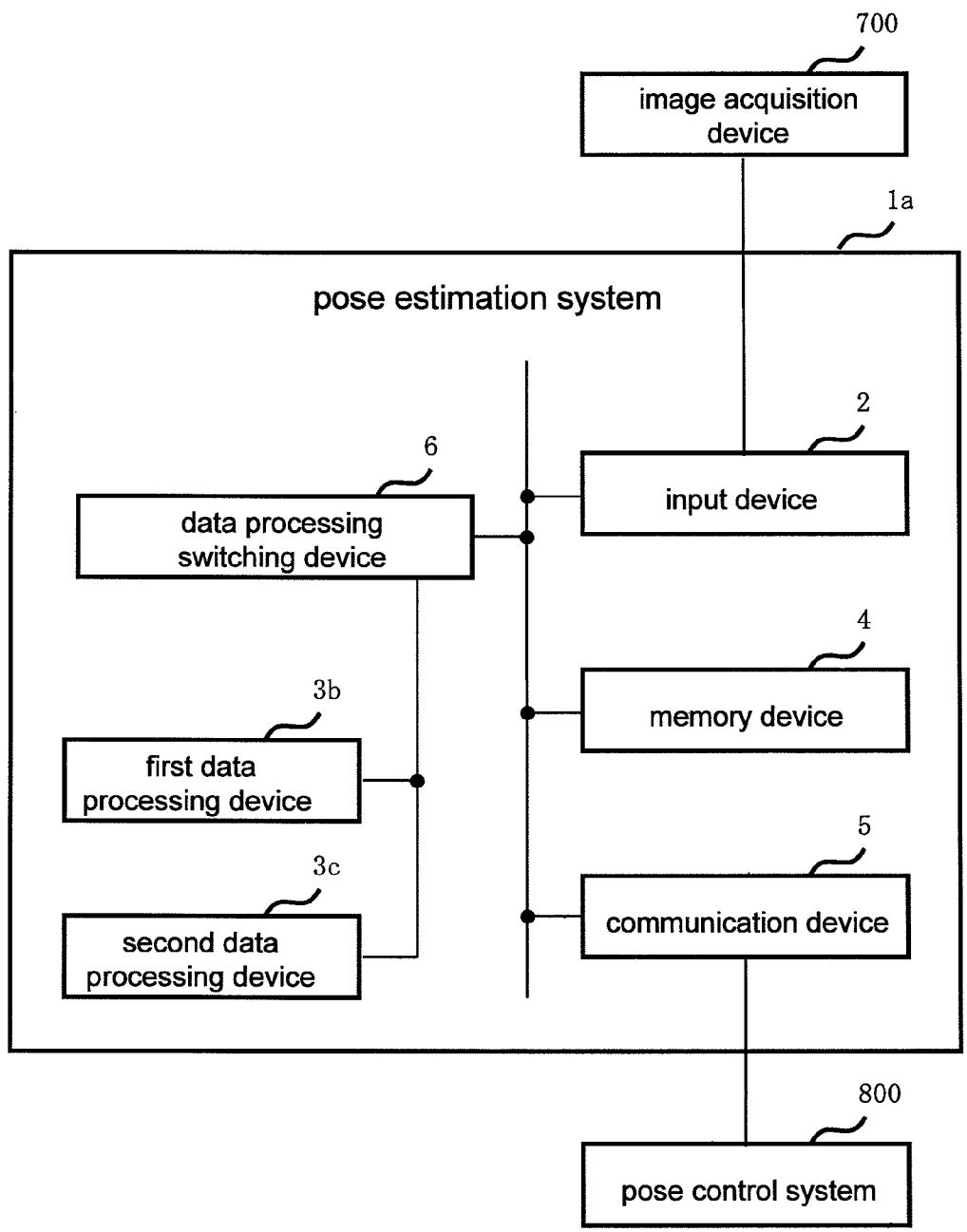
FIG. 16 shows the configuration of a pose estimation system according to the third embodiment.

Explanation next regards the details of the third embodiment of the present invention. As shown in FIG. 16, pose estimation system 1a of the third embodiment includes, in contrast to the first and second embodiments, a plurality of data processing devices (first data processing device 3b and second data processing device 3c). In addition, pose estimation system 1a further includes data processing switching device 6 for switching the data processing device that executes processing and for selectively operating first data processing device 3b and second data processing device 3c.

First data processing device 3b has the same configuration as data processing device 3 of the first embodiment shown in FIG. 9. Second data processing device 3c has the same configuration as data processing device 3a of the second embodiment shown in FIG. 15.

As previously described, the discretization width of parameter space and the ratio of the candidate region of the binarized image determine which of the amount of calculation by first data processing device 3b and the amount of calculation by second data processing device 3c is the greater.

As a result, by means of a "data processing switching process," data processing switching device 6 compares these amounts of calculation to select as the data processing device that executes processing the one of first data processing device 3b and second data processing device 3c that has a smaller amount of calculation. Data processing switching device 6 further finds "parameter space calculation amount" that is the amount of calculation for first data processing device 3b to identify the actual surface that is the reference surface and "image space calculation amount" that is the amount of calculation for second data processing device 3c to identify the actual surface. Data processing switching device 6 then, by comparing the parameter space calculation amount and the image space calculation amount, causes the data processing device for which the amount of calculation for processing is less to execute the computation of actual surfaces.

Figure 17:
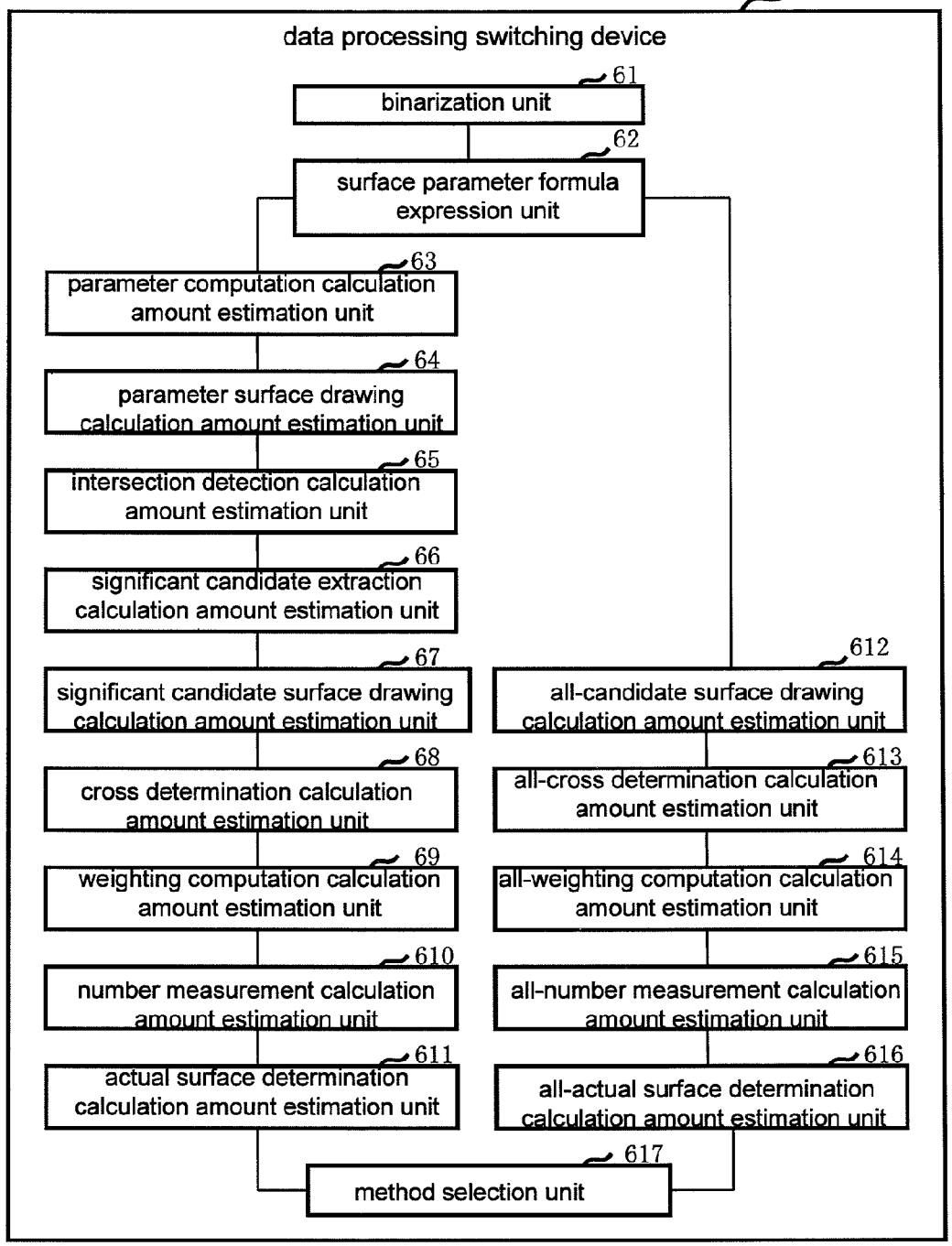
FIG. 17 shows the configuration of the data process switching device shown in FIG. 16.

Explanation next regards the details of data processing switching device 6. As shown in FIG. 17, data processing switching device 6 includes: binarization unit 61, surface parameter formula expression unit 62, parameter computation calculation amount estimation unit 63, parameter surface drawing calculation amount estimation unit 64, intersection detection calculation amount estimation unit 65, significant candidate extraction calculation amount estimation unit 66, significant candidate surface drawing calculation amount estimation unit 67, cross determination calculation amount estimation unit 68, weighting computation calculation amount estimation unit 69, number measurement calculation amount estimation unit 610, actual surface determination calculation amount estimation unit 611, all-candidate surface drawing calculation amount estimation unit 612, all-cross determination calculation amount estimation unit 613, all-weighting computation calculation amount estimation unit 614, all-number measurement calculation amount estimation unit 615, all-actual surface determination calculation amount estimation unit 616, and method selection unit 617.

Binarization unit 61 and surface parameter formula expression unit 62 both have the same configuration and serve the same functions as binarization unit 31 and surface parameter formula expression unit 32, respectively, shown in FIG. 9.

Constituent elements 63-611 estimate the "calculation amount" (calculation cost) of processing by each constituent element of first data processing device 3b based on the ratio of candidate region CR in the three-dimensional image that has undergone binarization by binarization unit 61 and the discretization width of each axis of parameter space.

Here, the calculation amount (calculation cost) is an "amount that indicates the volume of arithmetic processing" that data processing device 3 or 3a must carry out when finding values that are the objects of calculation. The form of the calculation amount is not subject to any particular limitation, and may be, for example, the number of times an arithmetic process is executed or the required time interval necessary for all arithmetic processing until the values that are the object of calculation are found.

Parameter computation calculation amount estimation unit 63 executes a "parameter computation calculation amount estimation process" and estimates the calculation amount when parameter computation unit 33 is processing. Based on the surface parameters formulas, the range of pose parameters, and the discretization width of parameter space for drawing surfaces in a three-dimensional image, parameter computation calculation amount estimation unit 63 computes the number of operations when computing the pose parameter combination that makes up surface parameter formulas (equations) that express all planes and curved surfaces for one pixel in candidate region CR. Parameter computation calculation amount estimation unit 63 then multiplies the number of operations that have been calculated and the number of pixels that are contained in the candidate region, estimates the obtained value as the calculation amount of processing by parameter computation unit 33, and takes this value as the "parameter computation calculation amount." In addition, the number of operations when calculating the combination of pose parameters that make up the surface parameter formulas is the number of times that the combination of pose parameters is changed (rewritten) in space parameters when finding the combination of pose parameters that make up the surface parameter formulas for each pixel.

Parameter surface drawing calculation amount estimation unit 64 executes a "parameter surface drawing calculation amount estimation process" and estimates the calculation amount when parameter surface drawing unit 34 is processing. For example, parameter surface drawing calculation amount estimation unit 64 multiplies the number of times the pose parameter combination is changed in parameter space that is obtained in the course of processing by parameter computation calculation amount estimation unit 63 by the number of operations necessary to change (rewrite) the pose parameter combination one time. Parameter surface drawing calculation amount estimation unit 64 then estimates the value obtained by this multiplication as the calculation amount of processing by parameter surface drawing unit 34, and takes this value as "parameter surface drawing calculation amount." Intersection detection calculation amount estimation unit 65 executes an "intersection detection calculation amount estimation process" and estimates the calculation amount when intersection detection unit 35 is processing. For example, intersection detection calculation amount estimation unit 65 first sets the number of pixels of the candidate region to the number of parameter surfaces, and then finds the mean area of the parameter surface by multiplying the number of parameter surfaces that has been set by the area of one pixel. Then, when parameter surfaces are randomly arranged in parameter space, intersection detection calculation amount estimation unit 65 estimates the number of intersections at which parameter surfaces intersect with each other. Intersection detection calculation amount estimation unit 65 multiplies the number of intersections that was estimated by the number of operations necessary for finding the coordinates in parameter space for one intersection, and estimates the value obtained as the calculation amount of processing by intersection detection unit 35 and takes this value as the "intersection detection calculation amount."

Significant candidate extraction calculation amount estimation unit 66 executes a "significant candidate extraction calculation amount estimation process" and estimates the calculation amount when significant candidate extraction unit 36 is processing. For example, significant candidate extraction calculation amount estimation unit 66 multiplies the number of intersections found by intersection detection calculation amount estimation unit 65, the number of operations necessary for reading the cross surface number relating to a single intersection, and the number of operations necessary when comparing the cross surface number and the first threshold value relating to a single intersection. Significant candidate extraction calculation amount estimation unit 66 then estimates the value obtained by multiplication as the calculation amount of processing by significant candidate extraction unit 36 and takes the value as the "significant candidate extraction calculation amount."

Significant candidate surface drawing calculation amount estimation unit 67 executes a "significant candidate surface drawing calculation amount estimation process" and estimates the calculation amount when significant candidate surface drawing unit 37 is processing. For example, significant candidate surface drawing calculation amount estimation unit 67 estimates the number of pose parameter combinations that are identified as significant candidates that are greater than the first threshold value based on the number of intersections obtained by intersection detection calculation amount estimation unit 65, the mean value of the pose parameters values at each intersection, and the distribution of pose parameter values. In addition, significant candidate surface drawing calculation amount estimation unit 67 estimates the number of operations when one significant candidate surface is drawn according to a surface parameter formula for drawing a surface in a three-dimensional image. Significant candidate surface drawing calculation amount estimation unit 67 then multiplies the number of operations when drawing a significant candidate surface that was estimated and the number of pose parameter combinations that are identified as significant candidates that were estimated, estimates the obtained value as the calculation amount of processing by significant candidate surface drawing unit 37, and takes this value as the "significant candidate surface drawing calculation amount."

Cross determination calculation amount estimation unit 68 executes a "cross determination calculation amount estimation process" and estimates the calculation amount when cross determination unit 38 is processing. Based on, for example, the number of pose parameter combinations that are identified as significant candidates that were estimated by significant candidate surface drawing calculation amount estimation unit 67 (the number of significant candidate surfaces), cross determination calculation amount estimation unit 68 finds the number of times that a significant candidate surface crosses one pixel in a candidate region when significant candidate surfaces are randomly arranged in a binarized image. Cross determination calculation amount estimation unit 68 then multiplies the number of times of cross of a pixel that was found and the number of operations required to obtain the coordinates of one cross pixel, estimates the obtained value as the calculation amount that cross determination unit 38 processes, and takes this value as the "cross determination calculation amount."

Weighting computation calculation amount estimation unit 69 executes a "weighting computation calculation amount estimation process," and estimates the calculation amount when weighting computation unit 39 is processing. For example, weighting computation calculation amount estimation unit 69 estimates the number of operations for computing one tangent plane in accordance with a surface parameter formula. Weighting computation calculation amount estimation unit 69 then adds the number of operations when computing the tangent plane that was estimated, the number of operations when finding the smallest angle from among each of the angles formed by the tangent plane with plane x-y, plane y-z, and plane z-x, and the number of operations for computing the slope weighting from the smallest angle. Weighting computation calculation amount estimation unit 69 further multiplies the value obtained by the addition, the mean area of a significant candidate surface, and the number of surfaces, estimates the obtained value as the calculation amount of processing by weighting computation unit 39, and takes this value as the "weighting computation calculation amount."

Although no limitations are here imposed on the method of computing the mean area of significant candidate surfaces by weighting computation calculation amount estimation unit 69, a method may be applied that is identical to the method of calculating the mean area of parameter surfaces by intersection detection calculation amount estimation unit 65.

Number measurement calculation amount estimation unit 610 executes a "number measurement calculation amount estimation process" and estimates the calculation amount when number measurement unit 310 carries out processing. Number measurement calculation amount estimation unit 610, for example, multiplies the mean area of the significant candidate surfaces that were found by weighting computation calculation amount estimation unit 69, the number of significant candidate surfaces, and the number of operations necessary for one multiplication of slope weighting, then estimates the obtained value as the calculation amount of processing by number measurement unit 310, and takes this value as the "number measurement calculation amount."

Actual surface determination calculation amount estimation unit 611 executes an "actual surface determination calculation amount estimation process" and estimates the calculation amount during processing by actual surface determination unit 311. For example, actual surface determination calculation amount estimation unit 611 multiplies the number of significant candidate surfaces that was estimated, the number of operations required to compare the slope weighting total (number) relating to one significant candidate surface and the second threshold value, and the calculation amount required for determining whether the number is a maximum in a prescribed neighboring region. Actual surface determination calculation amount estimation unit 611 then estimates the obtained value as the calculation amount of processing by actual surface determination unit 311 and takes this value as the "actual surface determination calculation amount."

Constituent elements 612-616 each estimate the calculation amount (calculation costs) of processing by each constituent element of second data processing device 3c.

All-candidate surface drawing calculation amount estimation unit 612 executes an "all-candidate surface drawing calculation amount estimation process" and estimates the calculation amount when all-candidate surface drawing unit 33a carries out processing. All-candidate surface drawing calculation amount estimation unit 612, for example, estimates the number of operations for one drawing of a candidate surface from a surface parameter formula that indicates a surface in a three-dimensional image. All-candidate surface drawing calculation amount estimation unit 612 then multiplies the number of operations necessary for the drawing of one candidate surface that was estimated and the number of all pose parameter combinations in parameter space, estimates the obtained value as the calculation amount of processing by all-candidate surface drawing unit 33a, and takes this value as the "all-candidate surface drawing calculation amount."

All-cross determination calculation amount estimation unit 613 executes an "all-cross determination calculation amount estimation process" and estimates the calculation amount when cross determination unit 34a carries out processing. All-cross determination calculation amount estimation unit 613 finds the "all-cross determination calculation amount" by the same process as cross determination calculation amount estimation unit 68.

All-weighting computation calculation amount estimation unit 614 executes an "all-weighting computation calculation amount estimation process" and estimates the calculation amount when weighting computation unit 35a carries out processing. All-weighting computation calculation amount estimation unit 614 finds the "all-weighting computation calculation amount" by the same process as weighting computation calculation amount estimation unit 69.

All-number measurement calculation amount estimation unit 615 executes an "all-number measurement calculation amount estimation process" and estimates the calculation amount when number measurement unit 36a is processing. All-number measurement calculation amount estimation unit 615 finds the all-number measurement calculation amount by the same process as number measurement calculation amount estimation unit 610.

All-actual surface determination calculation amount estimation unit 616 executes an "all-actual surface determination calculation amount estimation process" and estimates the calculation amount when actual surface determination unit 37a is processing. All-actual surface determination calculation amount estimation unit 616 finds the all-actual surface determination calculation amount by means of the same process as actual surface determination calculation amount estimation unit 611.

In first data processing device 3b, a limiting of the significant candidate surfaces is first carried out before significant candidate surface drawing unit 37, cross determination unit 38, weighting computation unit 39, number measurement unit 310, and actual surface determination unit 311 execute each process. Constituent elements 37-311 then each draw only the limited significant candidate surfaces on the three-dimensional image to continue processing.

On the other hand, in second data processing device 3c, all-candidate surface drawing unit 33a, cross determination unit 34a, weighting computation unit 35a, number measurement unit 36a, and actual surface determination unit 37a shown in FIG. 15 do not execute limiting of the significant candidate surfaces. As a result, each of constituent elements 33a-37a draws surfaces on an image for all parameter combinations and continue processing. In addition, the presence or absence of limiting of significant candidate surfaces is the only difference between the processing by each of constituent elements 37-311 and processing by each of constituent elements 33a-37a, and the calculation methods are the same.

Method selection unit 617 compares the "parameter space calculation amount" and the "image space calculation amount" and, based on the result of comparison, selects a data processing device for executing processing from among first data processing device 3b and second data processing device 3c.

The "parameter space calculation amount" is the sum of: the parameter computation calculation amount, the parameter surface drawing calculation amount, the intersection detection calculation amount, the significant candidate extraction calculation amount, the significant candidate surface drawing calculation amount, the cross determination calculation amount, the weighting computation calculation amount, the number measurement calculation amount, and the actual surface determination calculation amount.

The "image space calculation amount" is the sum of: the all-candidate surface calculation amount, the all-cross determination calculation amount, the all-weighting computation calculation amount, the all-number measurement calculation amount, and the all-actual surface determination calculation amount.

Method selection unit 617 selects first data processing device 3b when the parameter space calculation amount is determined to be smaller than the image space calculation amount, and selects second data processing device 3c when the image space calculation amount is determined to be smaller than the parameter space calculation amount. When the parameter space calculation amount and the image space calculation amount are determined to be equal, method selection unit 617 selects the data processing device in accordance with a predetermined rule.

In addition, when estimating the calculation amounts of processing by each of the constituent elements, the arrangement of surfaces may be determined stochastically and a prescribed probability distribution given to the calculation amounts themselves. For example, the estimated values may be expressed with error added. In such a case, when operations of numerical values that have probability distributions are carried out when finding the parameter space calculation amount or the image space calculation amount, the propagation of error may be taken into consideration and distributions therefore also given to the numerical values following the operations.

Fourth Embodiment

Figure 18:
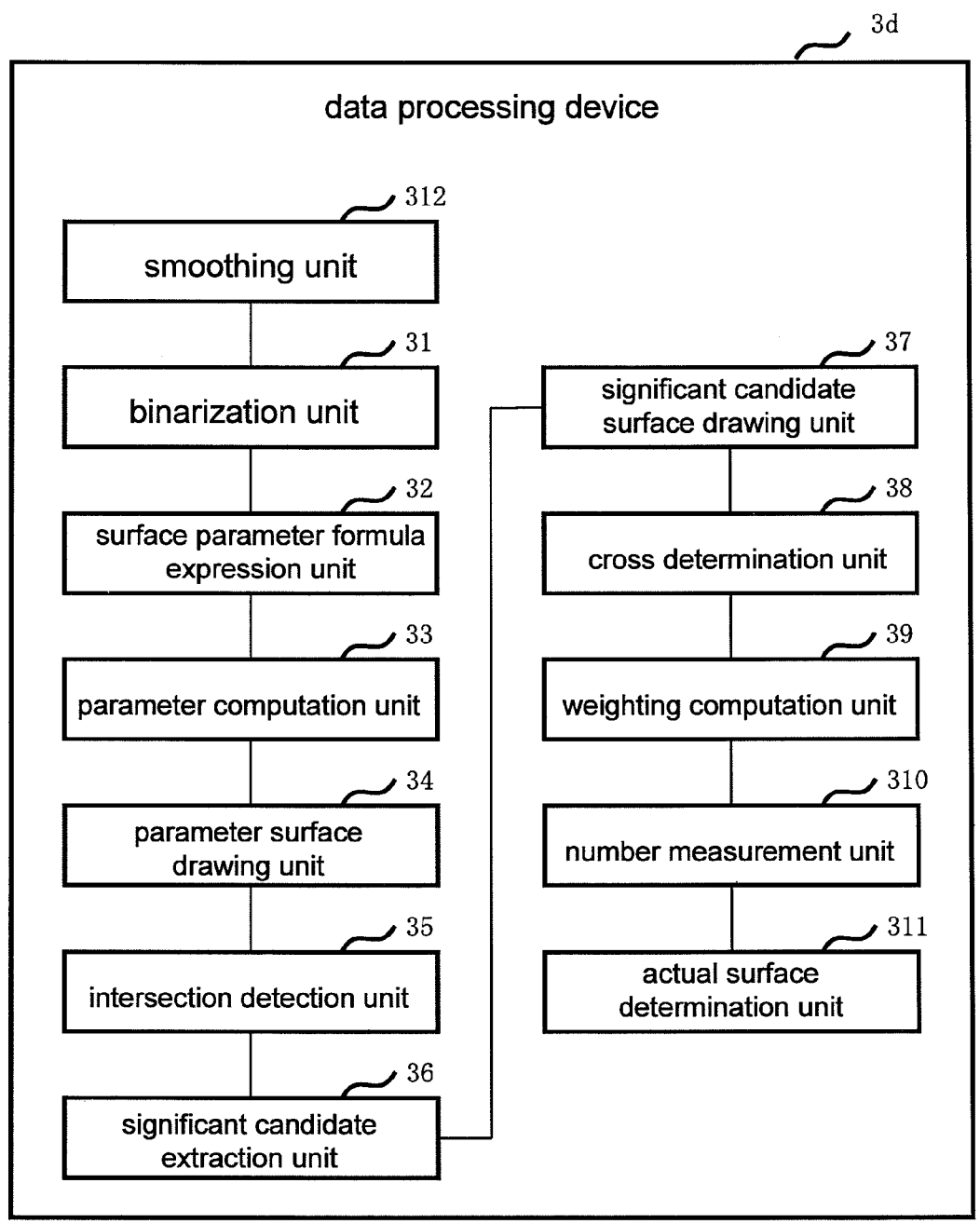
FIG. 18 shows an example of the configuration of the data processing device in the fourth embodiment.

Explanation next regards the details of the fourth embodiment of the present invention. As shown in FIG. 18, data processing device 3d of the fourth embodiment includes "smoothing unit 312" that is provided in the preceding section (input side) of binarization unit 31 belonging to data processing device 3 of the first embodiment. This smoothing unit 312 executes a "smoothing process" and has the function of subjecting a three-dimensional image to a process for smoothing the three-dimensional image.

No particular limitations are placed on the method of smoothing a three-dimensional image. For example, a typical smoothing method may be applied such as a method of convolution of a mask in which weighting is a three-dimensional Gaussian on a three-dimensional image, a method of taking the average within a local region, a method of taking an intermediate value in a local region, and a method of setting a model of the spatial distribution of pixel values in advance and then implementing minimum square fitting. This smoothing process enables a reduction of the influence of the noise component contained in the three-dimensional image.

In addition, smoothing unit 312 is not limited to addition in a section preceding binarization unit 31 in data processing device 3 of the first embodiment but may be added immediately before the binarization unit in the second or third embodiment.

Fifth Embodiment

Figure 19:
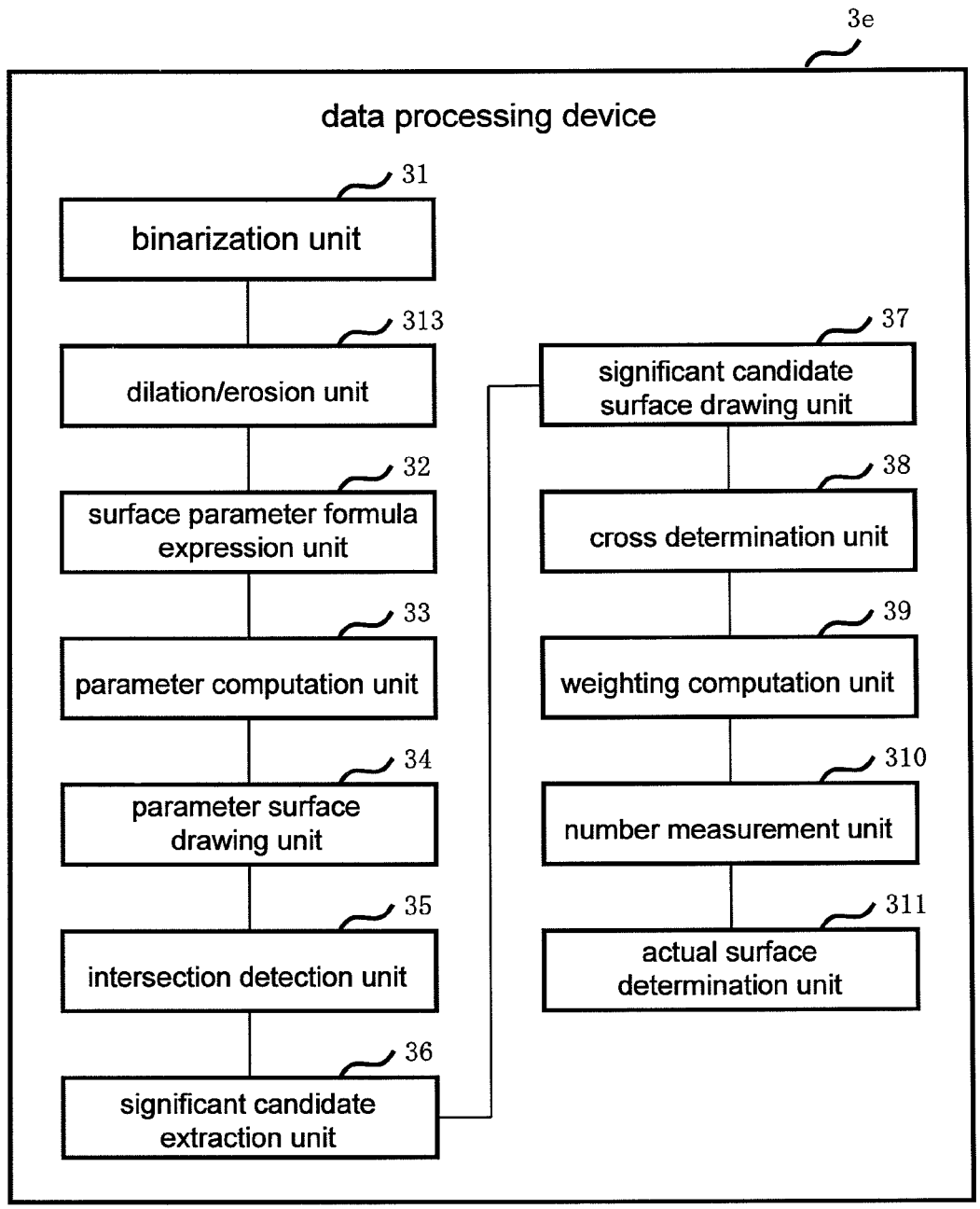
FIG. 19 shows an example of the configuration of the data processing device in the fifth embodiment.

Explanation next regards the details of the fifth embodiment of the present invention. As shown in FIG. 19, data processing device 3e of the fifth embodiment includes "dilation/erosion unit 313" provided in the section following (output side of) binarization unit 31 that is included in data processing device 3 of the first embodiment.

Dilation/erosion unit 313 executes a "dilation/erosion process," which is a "dilation process" of dilating candidate region CR or an "erosion process" of eroding candidate region CR of a binarized image.

The dilation/erosion process of a three-dimensional image is a process that applies a method typically used in a two-dimensional image to a three-dimensional image.

For example, in the "dilation process," a pixel of interest is regarded as the candidate region if there is a pixel of candidate region CR in even one of the six neighborhoods in three-dimensional space for the pixel of interest. In the "erosion process," a pixel of interest is regarded as the background region if there is a pixel belonging to background region BR in even one of the six neighborhoods for the pixel of interest. The dilation process or erosion process can reduce noise and to a certain degree can connect interrupted surfaces.

The order of executing the dilation process and erosion process is arbitrary, and the order of executing the processes can be interchanged. In addition, the execution of dilation and erosion may be iterated a prescribed number of times.

Dilation/erosion unit 313 is not limited to addition at the succeeding stage of binarization unit 31 included in data processing device 3 of the first embodiment and may also be added immediately before the binarization unit that is included in the first, second, or third embodiment.

Sixth Embodiment

Figure 20:
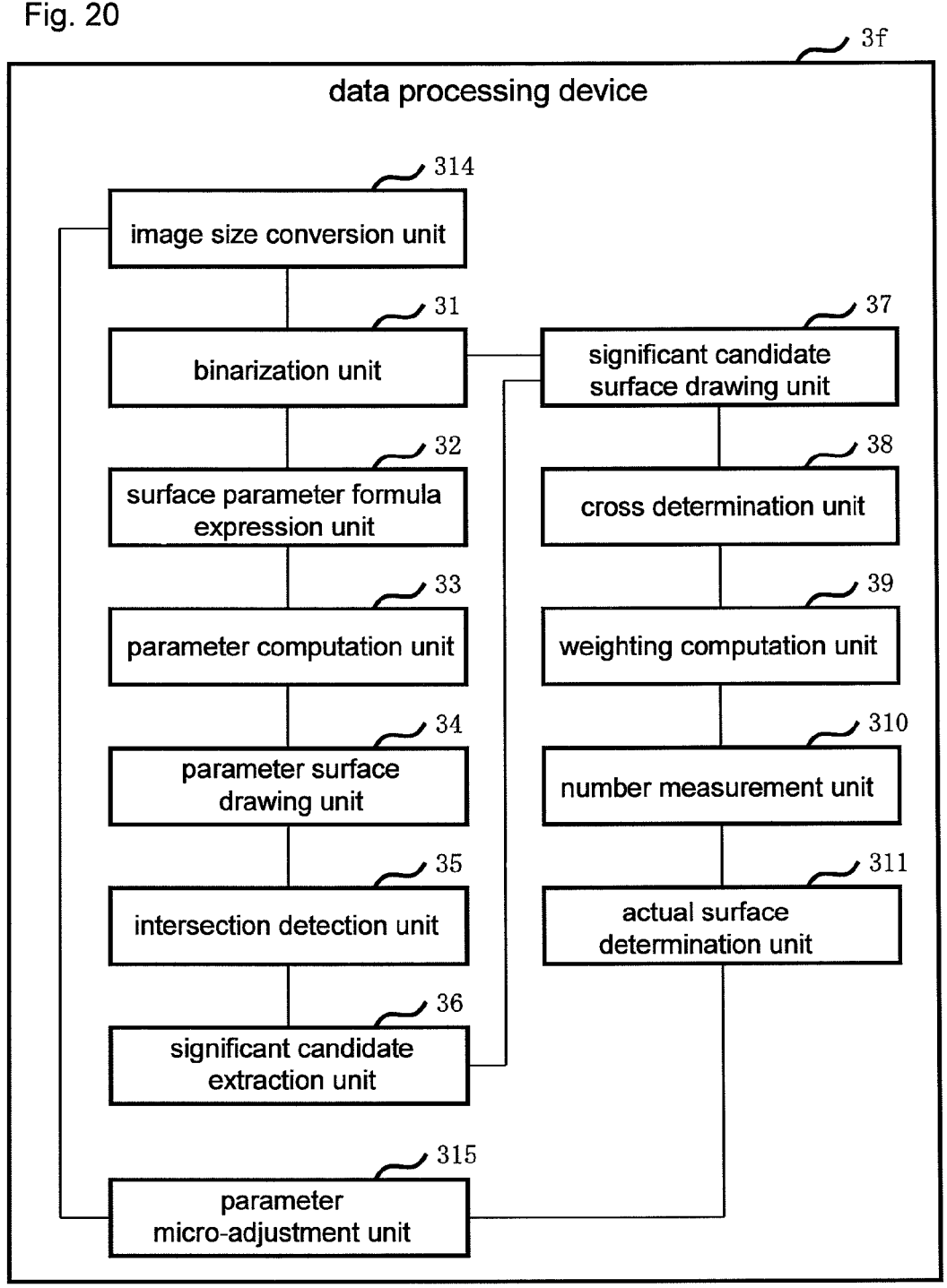
FIG. 20 shows a first example of the configuration of the data processing device in the sixth embodiment.

Explanation next regards the details of the sixth embodiment of the present invention. As shown in FIG. 20, data processing device 3f of the sixth embodiment includes "image size conversion unit 314" and "parameter micro-adjustment unit 315" in addition to the configuration of data processing device 3 of the first embodiment.

Image size conversion unit 314 executes an "image size conversion process" and converts the size of any image by reducing or enlarging the size of the image. Image size conversion unit 314 generates a reduced image of a three-dimensional image by reducing the three-dimensional image according to a prescribed reduction ratio and actual surface determination unit 311 finds an actual surface based on the reduced image.

Once an actual surface has been found by actual surface determination unit 311, image size conversion unit 314 further, by converting the reduced image obtained by first reducing the original three-dimensional image (for example, an image reduced to one-fourth of the original three-dimensional image) to a size that is smaller than the original three-dimensional image but that is larger than the reduced image (the image that is one-fourth the original), generates a new image (for example, an image that is one-half the original three-dimensional image).

Parameter micro-adjustment unit 315 executes a "parameter micro-adjustment process" that takes an actual surface that has been found as a new significant candidate surface to find a new actual surface in a neighborhood in parameter space. Parameter micro-adjustment unit 315 causes alternate and repeated execution of conversion (reduction) of image size of different magnifications by image size conversion unit 314 and identification of new actual surfaces by actual surface determination unit 311 until reaching a prescribed number of iterations or until obtaining a prescribed accuracy.

According to the sixth embodiment, by setting an image to successively higher definitions, actual surfaces can be detected with higher accuracy by means of arithmetic processing having a lower calculation amount.

Explanation next regards the details of operations when image size conversion unit 314 changes the size of a three-dimensional image (the reduction ratio or enlargement ratio of a three-dimensional image) in successive increments. Before actual surface determination unit 311 identifies an actual surface, processing is first carried out in binarization unit 31, followed by parameter computation unit 33 that has referred to surface parameter formula expression unit 32, and then parameter surface drawing unit 34, intersection detection unit 35, and significant candidate extraction unit 36, and then in significant candidate surface drawing unit 37 and succeeding sections. In the processing of this series of operations, operation results (actual surfaces corresponding to a prescribed image reduction ratio) are obtained for narrowing the region from all of parameter space by means of a Hough transform by means of the processing of each of surface parameter formula expression unit 32, parameter computation unit 33, parameter surface drawing unit 34, intersection detection unit 35, and significant candidate extraction unit 36.

If actual surfaces are first found in an image that has been reduced by a prescribed reduction ratio, these actual surfaces can then be used as significant candidate surfaces and the vicinities of these actual surfaces searched to achieve higher precision of parameters. As a result, in the second and succeeding operations in which a first operation is executed repeatedly, the processing by each of constituent elements 32-36 is unnecessary and the process of binarization unit 31 is executed, followed by the process of significant candidate surface drawing unit 37.

Image size conversion unit 314 and parameter micro-adjustment unit 315 can be added not only to data processing device 3 of the first embodiment, but also to the configurations of the second, third, fourth, and fifth embodiments.

As a result, the following explanation regards an example in which image size conversion unit 314 and parameter micro-adjustment unit 315 are added to data processing device 3g that has a configuration fundamentally identical to that of the second embodiment.

Figure 21:
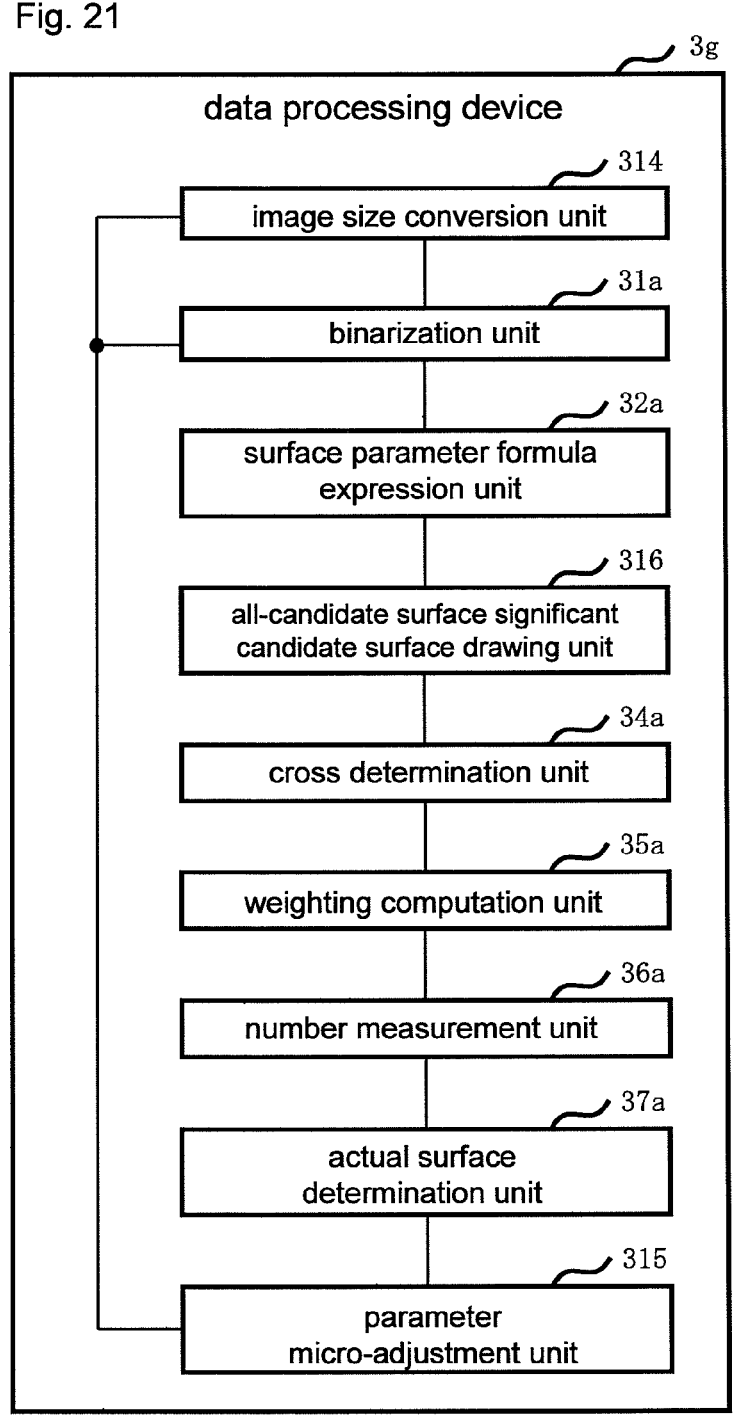
FIG. 21 shows a second example of the configuration of the data processing device in the sixth embodiment.

In addition, as shown in FIG. 21, data processing device 3g includes all-candidate surface significant candidate surface drawing unit 316 in place of all-candidate surface drawing unit 33a shown in FIG. 15.

All-candidate surface significant candidate surface drawing unit 316 executes an "all-candidate surface significant candidate surface drawing process" and draws significant candidate surfaces in a three-dimensional image for all parameter combinations in parameter space in a first operation that is executed before computation of actual surfaces. However, after actual surfaces have once been found, when seeking actual surfaces in the reduced image of the next size, actual surfaces are drawn based on combinations of parameters that are included in neighboring regions of the actual surfaces that were specified in parameter space.

Seventh Embodiment

Figure 22:
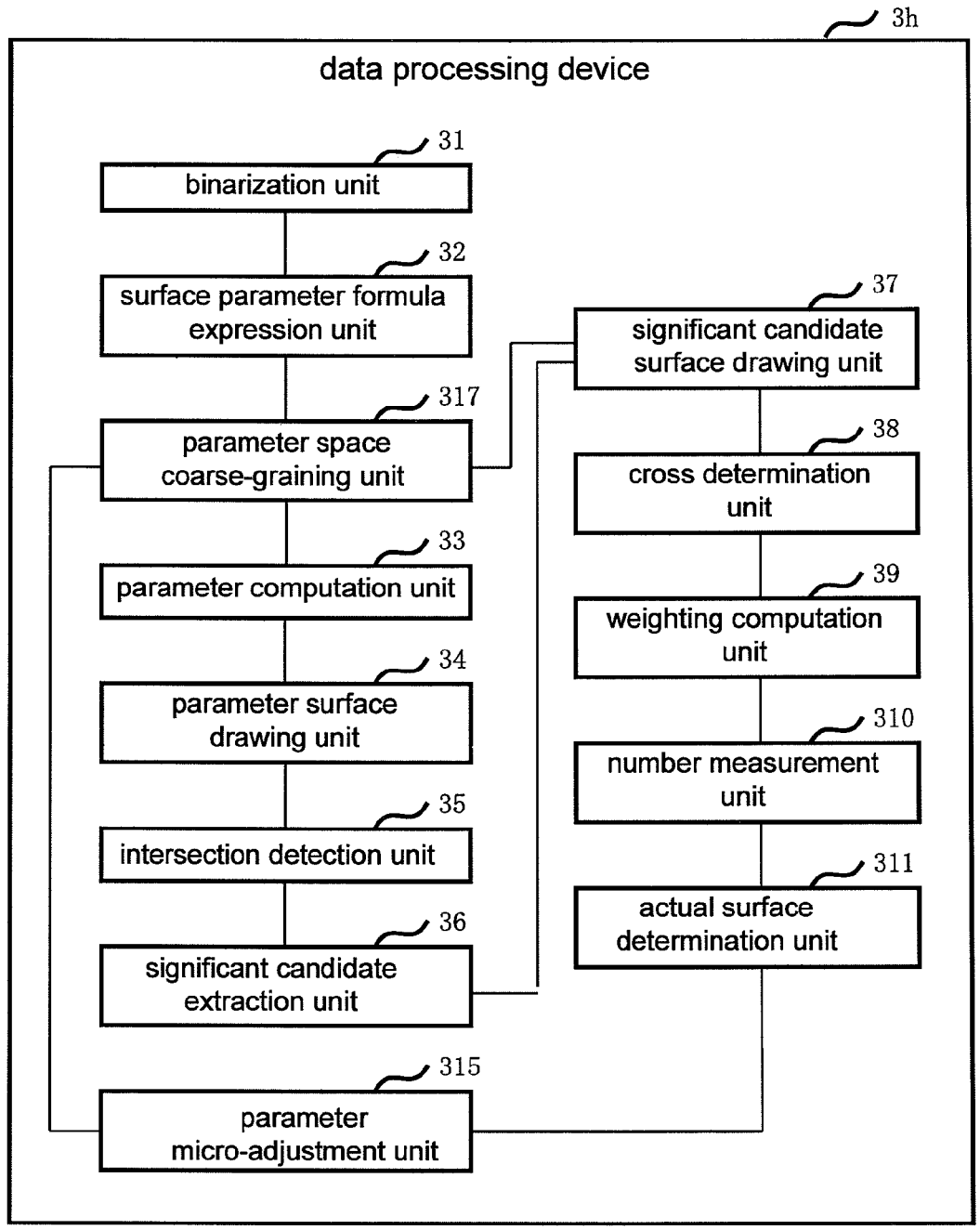
FIG. 22 shows a first example of the configuration of the data processing device in the seventh embodiment.

Explanation next regards the details of the seventh embodiment of the present invention. As shown in FIG. 22, data processing device 3h of the seventh embodiment of the present invention includes "parameter space coarse-graining unit 317" and "parameter micro-adjustment unit 315" that are provided in a stage succeeding (on the output side of) surface parameter formula expression unit 32 in the configuration of data processing device 3 of the first embodiment.

Parameter space coarse-graining unit 317 executes a "parameter space coarse-graining process" and coarsens parameter space by altering (for example, increasing) the discretization width of parameter space to a prescribed width and thus finds actual surfaces. After finding actual surfaces, parameter space coarse-graining unit 317 discretizes parameter space more finely.

Parameter micro-adjustment unit 315 executes a "parameter micro-adjustment process" and finds new actual surfaces in neighboring regions that take as a reference the actual surfaces that have once been found in parameter space that has been discretized (fractionalized) by parameter space coarse-graining unit 317.

Parameter micro-adjustment unit 315 repeatedly executes the derivation of new actual surfaces in parameter space of differing discretization width until a "prescribed number of processes" is reached, or repeatedly executes the computation of new actual surfaces until the discretization width reaches a prescribed value.

The seventh embodiment enables the extraction of surfaces with higher accuracy and with a lower amount of calculation by making the parameter space successively higher definitions.

Explanation next regards the details of operations when the discretization width of parameter space is repeatedly decreased in stages. In the first operation, following the process of surface parameter formula expression unit 32, parameter space coarse-graining unit 317 changes the discretization width of parameter space, following which the processing by each of constituent elements 32-36 is executed. The operations of each of constituent elements 32-36 in the first operation are carried out to constrict the region from all parameter space by means of a Hough transform.

As a result, in the second and succeeding operations, the process by significant candidate surface drawing unit 37 is executed following the process of parameter space coarse-graining unit 317. Once an actual surface has been obtained at a particular parameter space discretization width, this actual surface is used without alteration as a significant candidate surface to search the neighborhood to achieve higher precision of parameters.

In addition, parameter space coarse-graining unit 317 and parameter micro-adjustment unit 315 can be added not only to data processing device 3 of the first embodiment but also to the configurations of the second to sixth embodiments. Explanation therefore next regards an example in which parameter space coarse-graining unit 317 and parameter micro-adjustment unit 315 are added to data processing device 3i having fundamentally the same configuration as the second embodiment.

Figure 23:
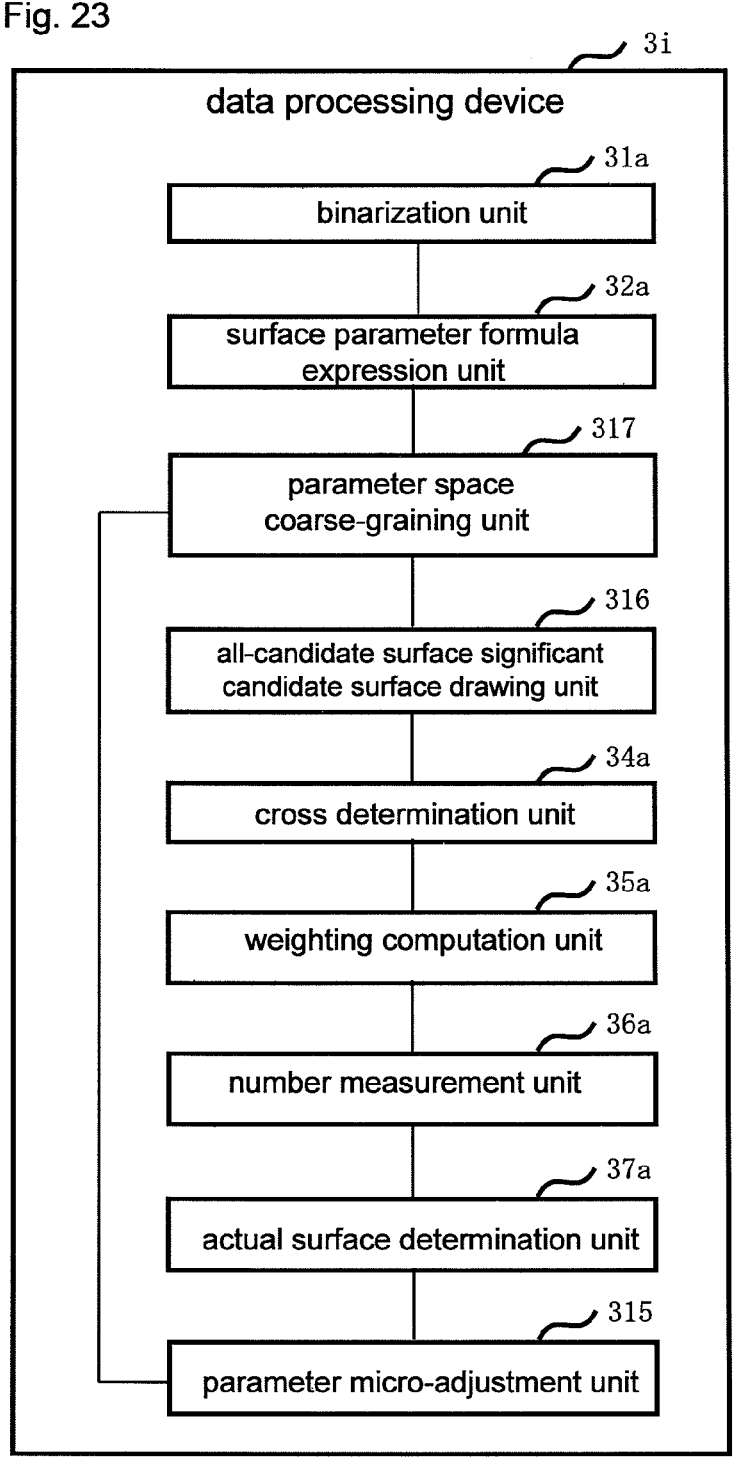
FIG. 23 shows a second example of the configuration of the data processing device in the seventh example.

As shown in FIG. 23, data processing device 3i includes parameter space coarse-graining unit 317 and parameter micro-adjustment unit 315. Data processing device 3i further includes all-candidate surface significant candidate surface drawing unit 315 in place of all-candidate surface drawing unit 33a shown in FIG. 15. All-candidate surface significant candidate surface drawing unit 316 draws surfaces for all parameter combinations in parameter space in a three-dimensional image in a first operation that is executed before computation of actual surfaces. However, when seeking actual surfaces in an image of reduced size in the second and succeeding operations after an actual surface has once been computed, actual surfaces are drawn based on parameter combinations in neighboring regions in parameter space that take the computed actual surface as a reference.

Eighth Embodiment

Figure 24:
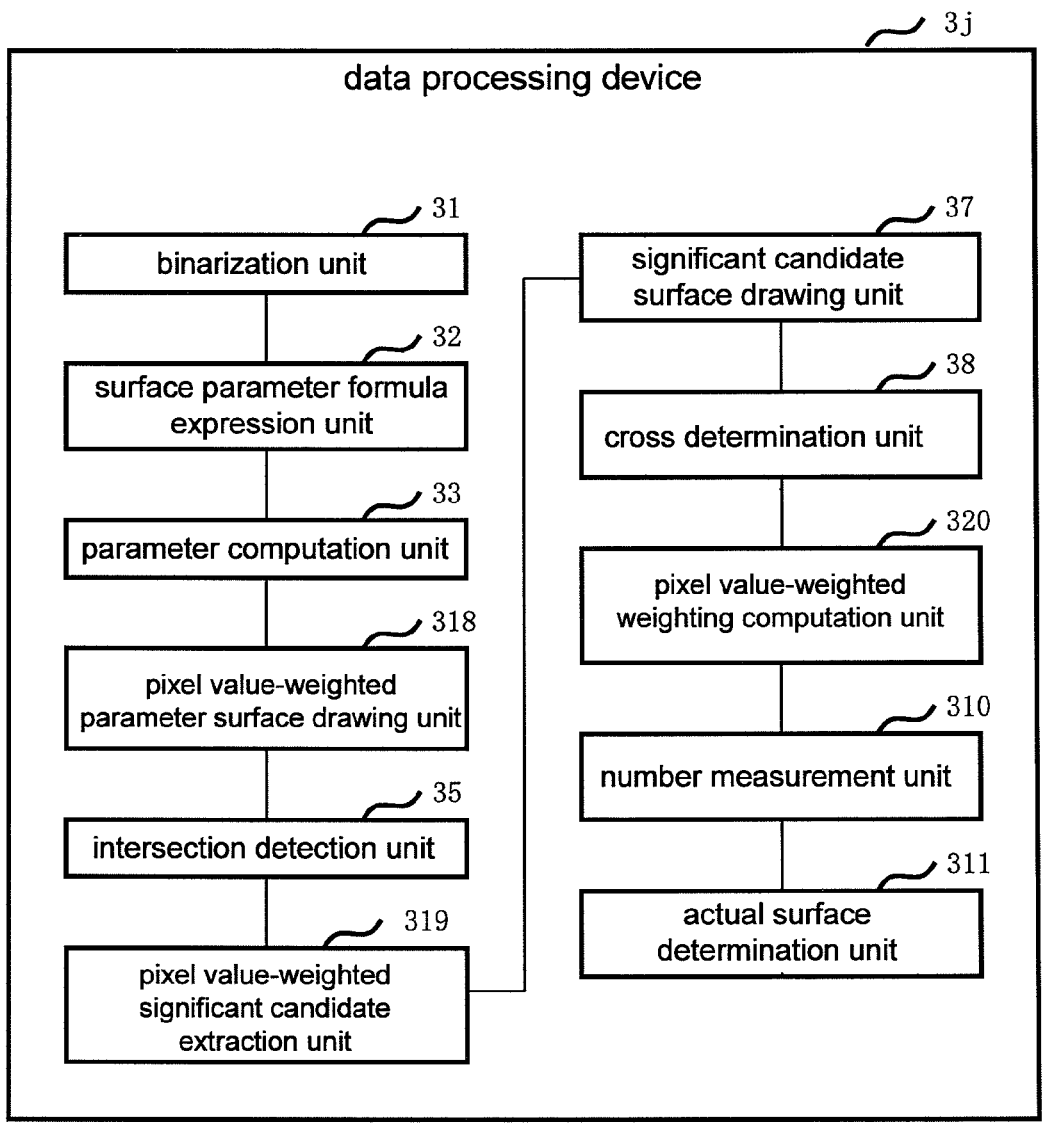
FIG. 24 shows a first example of the configuration of the data processing device in the eighth embodiment.

Explanation next regards the eighth embodiment of the present invention. As shown in FIG. 24, data processing device 3j of the eighth embodiment both includes "pixel value-weighted parameter surface drawing unit 318" in place of parameter surface drawing unit 34 shown in FIG. 9 and includes "pixel value-weighted significant candidate extraction unit 319" in place of significant candidate extraction unit 36 shown in FIG. 9. The data processing device further includes "pixel value-weighted weighting computation unit 320" in place of weighting computation unit 39 shown in FIG. 9.

When drawing a parameter surface in parameter space, pixel value-weighted parameter surface drawing unit 318 computes weightings based on pixel values of a three-dimensional image before binarization to find "pixel value weightings." Actual surfaces that clearly appear in a three-dimensional image but that have small area can be detected by applying "pixel value weightings."

As the "pixel value weightings," pixel values may be used without alteration or values may be used that are obtained by a logarithmic transformation of pixel values or that are obtained by conversion of pixel values by prescribed functions. In other words, pixel value-weighted parameter surface drawing unit 318 draws parameter surfaces that accord with surface parameter formulas based on pixel value-weighted parameters that are found by multiplication of pose parameter combinations that have been computed by parameter computation unit 33 and values computed based on pixel values of an image before binarization by binarization unit 31.

When, at an intersection, the sum of the number of cross surfaces at cross point coordinates at which parameter surfaces intersect with each other and pixel value weightings is greater than a prescribed value, and moreover, the cross surface number is a maximum in neighboring regions that take these cross point coordinates as a reference, pixel value-weighted significant candidate extraction unit 319 identifies the parameter combinations at these cross point coordinates as a significant candidate of a parameter combination that form a reference surface that is the object of detection.

Based on the angle formed by the tangent planes at the cross pixels that were found by cross determination unit 38 and surfaces formed by each of the axes of the parameter space, pixel value-weighted weighting computation unit 320 finds a slope weighting for each cross pixel identified by cross determination unit 38, multiplies the "slope weightings" that were found and "pixel value weightings" that were computed based on the pixel values of the three-dimensional image before the binarization process by binarization unit 31, and finds "pixel value-weighted slope weightings," which are new slope weightings.

Each of constituent elements 318-320 that take pixel value weightings into consideration may be added not only to data processing device 3 of the first embodiment, but also to the configurations of the second to seventh embodiments. When added to data processing device 3a of the second embodiment, pixel value-weighted weighting computation unit 320 may be provided in place of weighting computation unit 35a shown in FIG. 15, as in data processing device 3k shown in FIG. 25.

Figure 25:
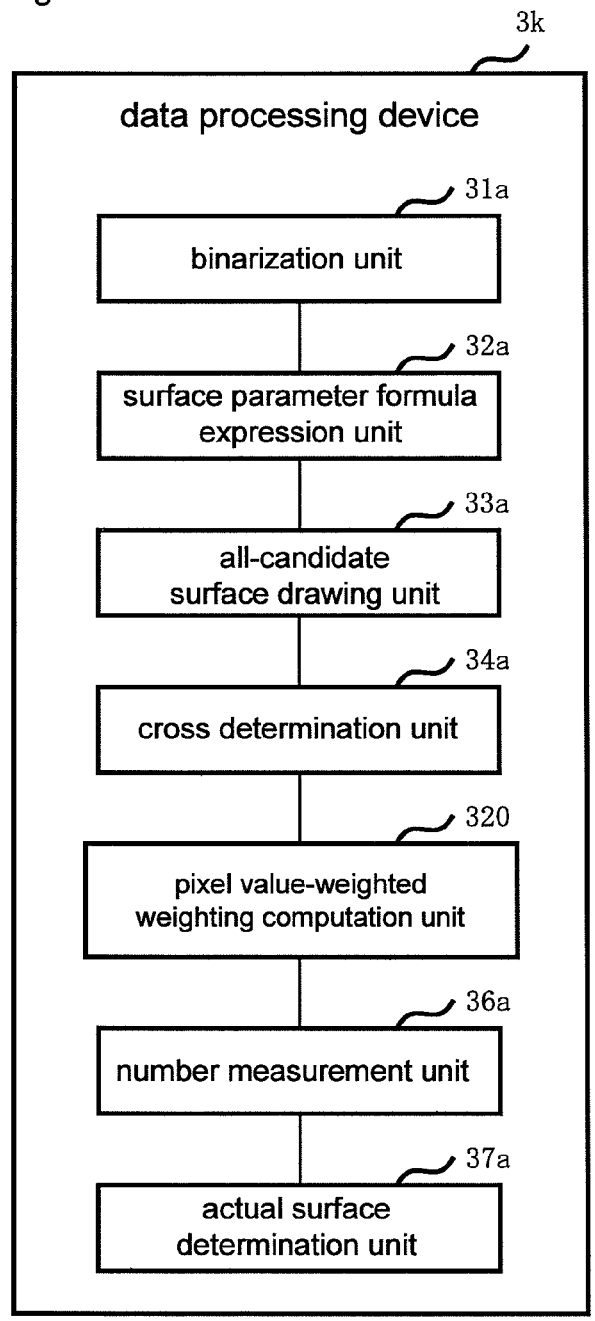
FIG. 25 shows a second example of the configuration of the data processing device in the eighth embodiment.

Alternatively, when each of constituent elements 318-320 are applied in the third embodiment, data processing device 3j shown in FIG. 24 is applied as the first data processing device and data processing device 3k shown in FIG. 25 is applied as the second data processing device.

Figure 26:
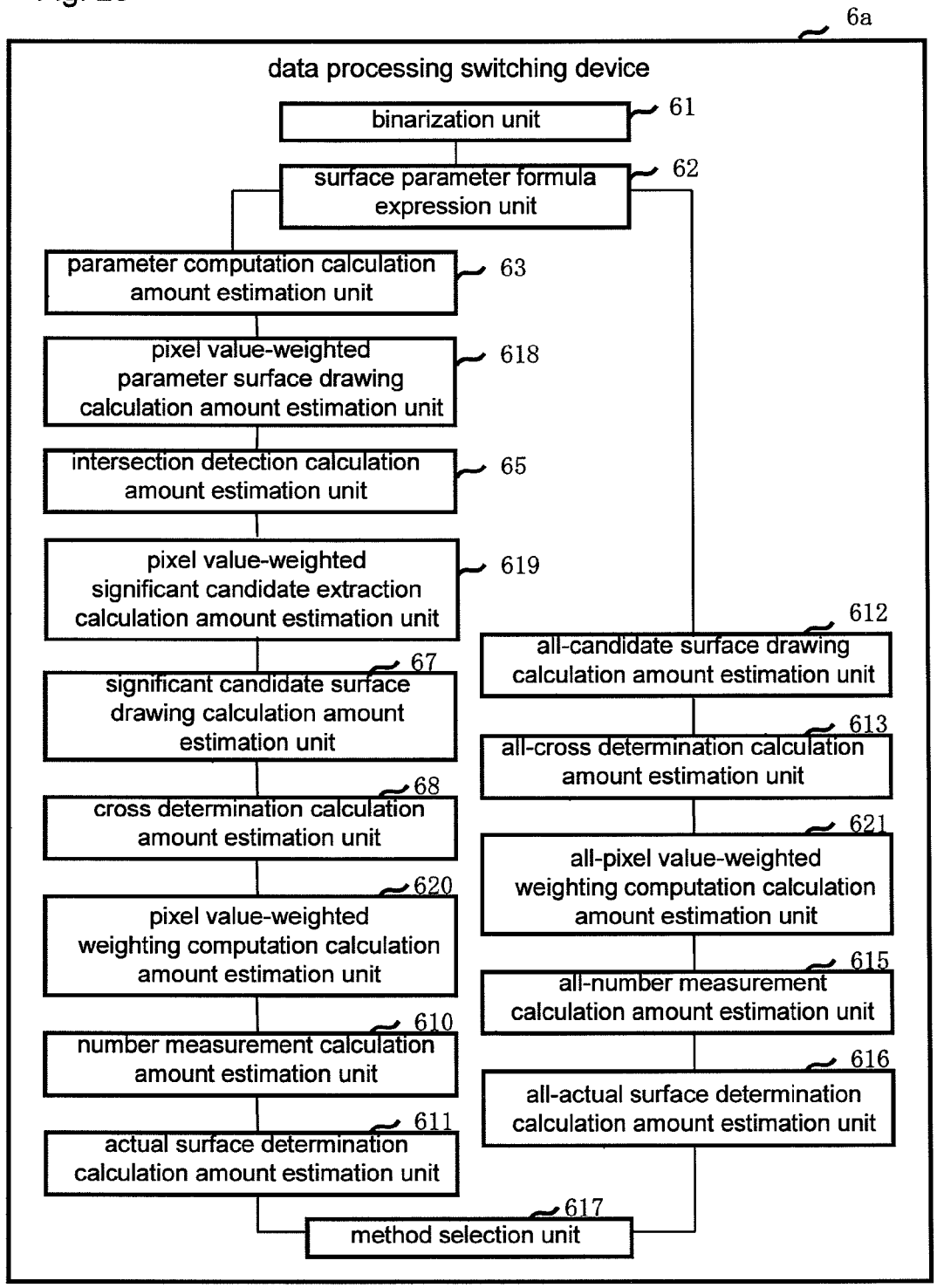
FIG. 26 shows an example of the configuration of the data process switching device in the eighth embodiment.

At this time, data processing switching device 6a includes "pixel value-weighted parameter surface drawing calculation amount estimation unit 618" in place of parameter surface drawing calculation amount estimation unit 64 shown in FIG. 17, as shown in FIG. 26. In addition, data processing switching device 6a includes "pixel value-weighted significant candidate extraction calculation amount estimation unit 619" in place of significant candidate extraction calculation amount estimation unit 66 shown in FIG. 17. Still further, data processing switching device 6a includes "pixel value-weighted weighting computation calculation amount estimation unit 620" in place of weighting computation calculation amount estimation unit 69 shown in FIG. 17. Finally, data processing switching device 6a includes "all-pixel value-weighted weighting computation calculation amount estimation unit 621" in place of all-weighting computation calculation amount estimation unit 614 shown in FIG. 17. Constituent elements 618-621 enable the estimation of calculation amount while taking pixel value weightings into consideration, and based on the estimated amount of calculation, data processing switching device 6a selectively activates the one of first data processing device 3j and second data processing device 3k that entails a lower amount of calculation.

Ninth Embodiment

Figure 27:
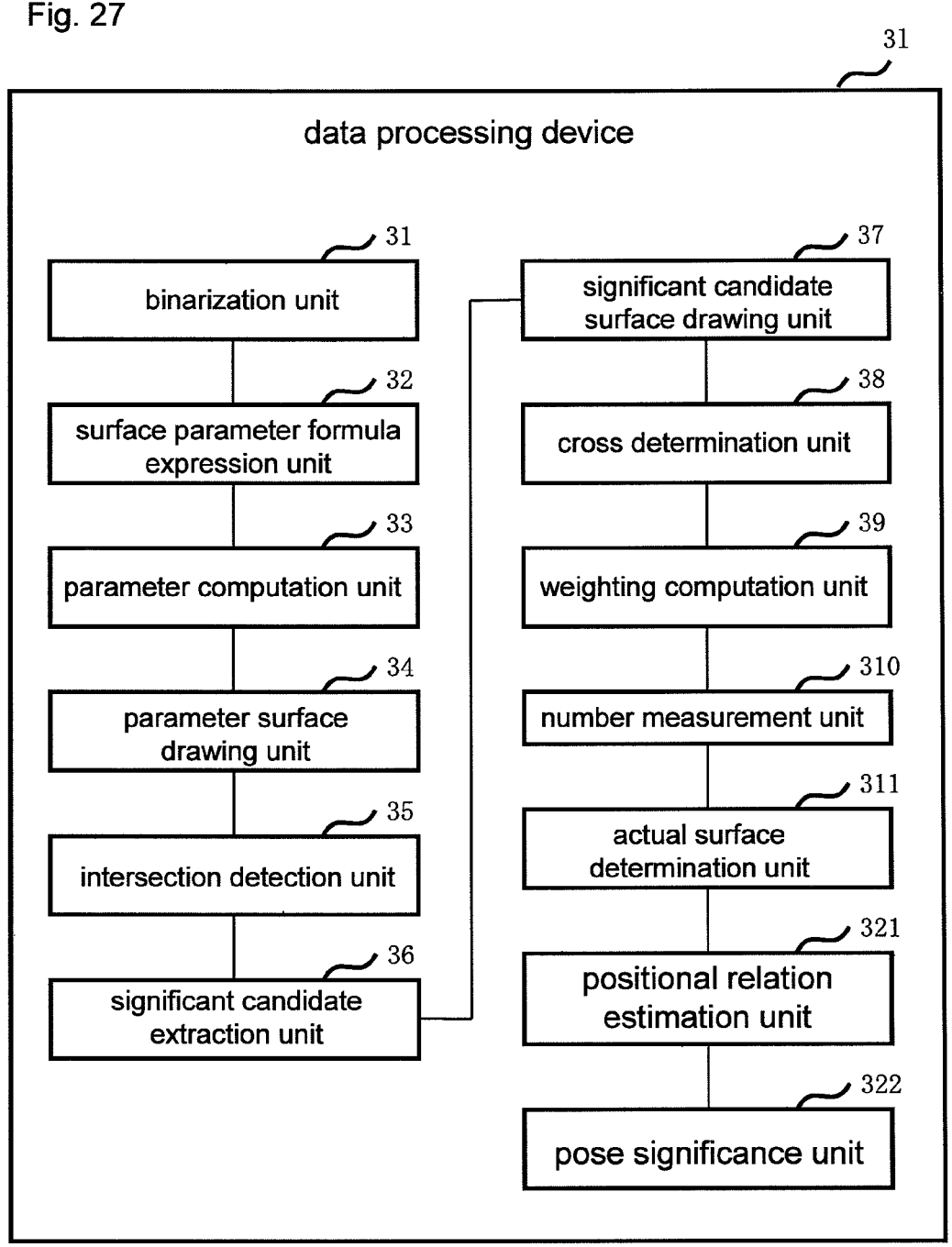
FIG. 27 shows the configuration of the data processing device in the ninth embodiment.

Explanation next regards the details of the ninth embodiment of the present invention. As shown in FIG. 27, data processing device 3l of the ninth embodiment includes "positional relation estimation unit 321" and "pose significance unit 322" in addition to the configuration of data processing device 3 shown in FIG. 9.

Positional relation estimation unit 321 executes a "positional relation estimation process" and estimates the positional relation of each actual surface when a plurality of actual surfaces appear in a three-dimensional image that is applied as input by external data input unit 21. For example, when two actual surfaces appear, positional relation estimation unit 321 estimates the actual surface of the two actual surfaces that is positioned above. In addition, positional relation estimation unit 321 identifies an actual surface by placing the actual surface in association with a physical entity (such as the ground surface, ocean surface, or ocean floor) that actually corresponds to the actual surface.

A case in which a plurality of actual surfaces appear in a three-dimensional image that has been acquired by external image acquisition device 700 is, for example, a case in which SONAR is used in the ocean to capture a three-dimensional image in which two surfaces that correspond to the ocean surface and the ocean floor appear.

Positional relation estimation unit 321 executes a "positional relation estimation process" and holds history such as the pose, position, and speed up to the current time. Positional relation estimation unit 321 then estimates the relative positional relation between each of the actual surfaces that appear in the three-dimensional image based on each item of history that is held and information obtained by external sensors (such as geomagnetism, atmospheric pressure, temperature, water pressure, gravity, etc.).

Pose significance unit 322 executes a "pose significance process" and executes "significance conferring," which is a process of determining the pose of the object of pose estimation with respect to a reference surface by placing pose parameters and reference surface in correspondence.

For example, pose significance unit 322 discriminates the surface that is the ocean surface and the surface that is the ocean floor based on the positional relation of the ocean surface and ocean floor, and discriminates the pose parameters for each surface (for example, pose parameters for the ocean surface and pose parameters for the ocean floor), whereby the process of conferring significance of the pose parameters is realized. This "significance conferring" means resolving the type of reference surface to which each pose parameter corresponds. Pose significance unit 322 further discriminates surfaces based on the shape of a surface or the distribution of pixel values of a surface and confers significance of pose parameters for each surface that has been discriminated. Pose significance unit 322 further discriminates surfaces that appear in an image based on positional relation and surface shape or the distribution of pixel values of a surface and confers significance of pose parameters for each surface that has been discriminated. Pose significance unit 322 further supplies the pose parameters to which significance has been conferred to pose control system 800 by way of communication device 5. Positional relation estimation unit 321 and pose significance unit 322 clarify the identities of the object reference surfaces of pose parameters that were found, and thus enable more accurate control of the pose of an air vehicle or underwater vehicle.

In addition, positional relation estimation unit 321 and pose significance unit 322 may be added not only to data processing device 3 of the first embodiment, but also to the configuration of the second to eighth embodiments.

As described hereinabove, pose estimation system 1 of the present invention features the following effects.

As the first effect, a surface that serves as the reference of pose parameters can be detected with high accuracy even in a three-dimensional image having an abundance of noise, whereby pose can be estimated with higher accuracy. This effect can be realized because the use of all pixels that make up a surface in three-dimensional space decreases the influence of the noise component.

As the second effect, a surface that serves as the reference of pose parameters can be detected by a simple method, whereby the processing time when improving accuracy can be shortened. This effect can be realized because an entire surface is directly computed without computing, for example, straight lines that make up a surface or a plurality of partial surfaces (patches) that are portions of surfaces.

As a third effect, of pose parameters, pose parameters that are indicated by angles can be estimated with a uniform accuracy without regard to the values of the parameters, and further, accuracy can be easily designated. This effect can be realized because formulas that describe surfaces are constructed to enable input of pose parameters without alteration as the parameters of a Hough transform.

As the fourth effect, the detection accuracy of a surface can be made uniform in a three-dimensional image. This effect can be realized because surfaces that correspond to each parameter are drawn in a three-dimensional image, whereby only one surface is specified in a three-dimensional image for a parameter set in parameter space. In addition, increase of calculation load can be suppressed because this process is realized by only the simple process of drawing surfaces in a three-dimensional image, and regarding the number of these surfaces that are drawn, the number is limited to surfaces that exceed a threshold value and other surfaces in the vicinity having a greater number or number of times.

As the fifth effect, detection accuracy can be realized uniformly on a three-dimensional image not just for planes but for curved surfaces as well. This effect can be realized because the process involves simply drawing surfaces in accordance with parameters so that parameter sets in parameter space and surfaces in a three-dimensional image can be placed in one-to-one correspondence. When described by parameters, the detection accuracy of a surface does not depend on the shape of the surface.

As a sixth effect, detection accuracy can be fixed regardless of the direction of the surface. This effect can be realized because the number of layers of parameter surfaces counted up in parameter space according to the slope of a tangent plane of the surface of the object of detection with respect to the plane x-y, the plane y-z, and the plane z-x is adjusted to a value obtained when the area of a surface is measured based on Euclidean distance in a three-dimensional image.

As a seventh effect, increase in the amount of calculation can be suppressed even when the ratio of the candidate region after binarization with respect to the entire image is high. This effect can be realized because, in a configuration that discovers a parameter set that makes up the surface that is to be detected by first carrying out an inverse Hough transform rather than implementing a Hough transform, it is determined before beginning execution of the surface detection process whether to carry out a Hough transform based on the results of estimating the calculation amount resulting from each method.

In addition to a form in which the processing in pose estimation system 1 is realized by the above-described dedicated hardware, the present invention may also be realized by recording a program for realizing these functions on a recording medium that is readable by pose estimation system 1, and causing this program that has been recorded on a recording medium to be read to and executed by pose estimation system 1. The recording medium that is readable by pose estimation system 1 refers to, for example, a relocatable recording medium such as a floppy disk (registered trademark), a magneto-optic disk, a DVD, or a CD, or to an HDD that is incorporated in pose estimation system 1. The program that is recorded on this recording medium is read to, for example, data processing device 3 that is included in pose estimation system 1, and under the control of data processing device 3, the same processes as described hereinabove are carried out.

In this case, data processing device 3 that is included in pose estimation system 1 operates as a computer that executes a program that has been read from a recording medium on which the program has been recorded.

While the invention has been particularly shown and described with reference to exemplary embodiments thereof, the invention in not limited to these embodiments. It will be understood by those of ordinary skill in the art that various changes in form and details may be made therein without departing from the spirit and scope of the present invention as defined by the claims.

What is claimed is:

1. A data processing device for, based on an image received as input, estimating pose of an object of pose estimation with respect to a reference surface that serves as a reference for estimating pose, said data processing device comprising:

a binarization unit for dividing said image into a candidate region that is a candidate for said reference surface and a background region that is a region other than the candidate region;

a surface parameter formula expression unit for extracting pose parameters that indicate the pose of an object of pose estimation with respect to a reference surface that appears in said image that was received as input and, based on the combination of a value obtained by implementing transform by a prescribed function upon, of the pose parameters that were extracted, parameters that indicate a direction in which the object of the pose estimation is directed and pose parameters other than the parameter that indicate direction, finding surface parameter formulas that are numerical formulas that express said reference surface;

an all-candidate surface drawing unit for, based on the combination of all pose parameters in parameter space, which is space having, as the axes of base vectors, each of the parameters included in said pose parameters, drawing candidate surfaces that accord with said surface parameter formulas on said image in said parameter space;

a cross determination unit for, as regards each candidate surface that was drawn by said all-candidate surface drawing unit, identifying pixels that are located on, of said candidate region, the candidate surface, and pixels that are located within a prescribed range from the candidate surface as cross pixels and finding coordinates of the cross pixels and tangent planes at said cross pixels;

a weighting computation unit for, based on angles that are formed by tangent planes at the cross pixels that were found by said cross determination unit and planes that are formed by the axes of each base vector included in said parameter space, finding a slope weighting for each cross pixel that was identified by said cross determination unit;

a number measurement unit for computing for each of said candidate surfaces a number that is the value obtained by adding up the slope weightings of cross pixels that were found by said weighting computation unit that were contained in each of the candidate surfaces; and an actual surface determination unit for, based on the number computed by said number measurement unit, identifying from among candidate surfaces drawn by said all-candidate surface drawing unit an actual surface that is a reference surface that actually exists in said image.

2. The data processing device according to claim 1, further comprising a smoothing unit for implementing a process to smooth said image received as input, wherein said binarization unit, based on an image that has undergone smoothing by said smoothing unit, generates a binarized image.

3. The data processing device according to claim 1, further comprising a dilation/erosion unit for subjecting a candidate region of a binarized image generated by said binarization unit to a prescribed number of dilation process for dilating the candidate region or erosion processes for eroding the candidate region.

4. The data processing device according to claim 3, further comprising:

an image size conversion unit for changing the image size by reducing or enlarging the size of an image; and a parameter micro-adjustment unit for causing the alternate and repeated execution of changes of image sizes of differing magnifications by said image size conversion unit and identification of a new actual surface by said actual surface determination unit until a prescribed number is reached or until a prescribed accuracy is obtained;

wherein said image size conversion unit:

before said actual surface determination unit identifies an actual surface, generates a reduced image by reducing at a prescribed reduction ratio said image received as input; and after said actual surface determination unit identifies an actual surface, generates a new image by changing said reduced image that was generated to a size that is smaller than said image received as input, and moreover, larger than the reduced image.

5. The data processing device according to claim 1, further comprising:

a parameter space coarse-graining unit for increasing the discretization width of said parameter space to a predetermined width to coarsen the parameter space and find an actual surface, and after once finding an actual surface, changing discretization to make the parameter space finer; and a parameter micro-adjustment unit for repeatedly executing derivation of new actual surfaces in the parameter space of different discretization widths in neighboring regions of an actual surface that has been found in parameter space that has undergone said discretization until reaching a prescribed number of processes or until the discretization width reaches a prescribed value.

6. The data processing device according to claim 1, further comprising a pixel value-weighted weighting computation unit for finding pixel value-weighted slope weightings by multiplying said slope weightings and values computed based on pixel value of an image before binarization by said binarization unit.

7. The data processing device according to claim 1, further comprising:

a positional relation estimation unit for, when a plurality of actual surfaces appear in said image that is received as input, estimating both the positional relation between each of said actual surfaces and identifying the actual surfaces by placing said actual surfaces in correspondence with physical entities; and a pose significance unit for carrying out a significance process, which is a process of, based on the positional relation of said plurality of surfaces estimated by said positional relation estimation unit, placing said pose parameters in correspondence with said actual surfaces to determine the pose of an object of pose estimation with respect to the actual surfaces.

8. A data processing device comprising:

a binarization unit for dividing an image received as input into a candidate region that is a candidate for a reference surface that serves as a reference for estimating pose and a background region that is a region other than the candidate region;

a surface parameter formula expression unit for extracting pose parameters that indicate pose of an object of pose estimation with respect to a reference surface that appears in said image that was received as input and, based on a combination of values obtained by implementing a transform by a prescribed function upon, of the pose parameters that were extracted, parameters that indicate the direction in which the object of pose estimation is directed and pose parameters other than the parameters that indicate direction, finding surface parameter formulas that are numerical formulas that express said reference surface;

a parameter computation unit for, based on pose parameters that were extracted by said surface parameter formula expression unit, computing the combination of pose parameters that make up said surface parameter formulas that express all surfaces that pass through each pixel contained in the candidate region that was divided by said binarization unit;

a parameter surface drawing unit for, based on the combination of pose parameters computed by said parameter computation unit, drawing parameter surfaces in accordance with said surface parameter formulas on parameter space, which is space that includes each of the parameters belonging to said pose parameters as the axes of base vectors;

an intersection detection unit for finding cross point coordinates, which are the coordinates of intersections through which pass a plurality of said parameter surface that were drawn by said parameter surface drawing unit, and a cross surface number, which is the number of parameter surfaces that pass through the cross point coordinates;

a significant candidate extraction unit for, when the cross surface number at each cross point that was found by said intersection detection unit is compared with cross surface numbers at other cross point coordinate corresponding to the cross surface number and is thus determined to be a maximum, identifying the combination of pose parameters that make up the parameter surface that corresponds to the determined cross surface number as a significant candidate that is an optimum combination of pose parameters for expressing said reference surface;

a significant candidate surface drawing unit for, based on a significant candidate identified by said significant candidate extraction unit and a combination of pose parameters that were computed by said parameter computation unit for which distance to said significant candidate in parameter space in prescribed neighboring regions that take the significant candidate as a reference is no greater than a prescribed value, drawing significant candidate surfaces on said image;

a cross determination unit for, regarding each significant candidate surface that was drawn by said significant candidate surface drawing unit, identifying pixels that are located on, of said candidate region, the significant candidate surface, and pixels that are located within a prescribed range from the significant candidate surface as cross pixels and finding coordinates of the cross pixels and tangent planes at said cross pixels;

a weighting computation unit for, based on angels that are formed by tangent planes in cross pixels that were found by said cross determination unit and planes that are formed by the axes of each base vector included in said parameter space, finding a slope weighting for each cross pixel that was identified by said cross determination unit;

a number measurement unit for computing for each of said significant candidate surfaces a number that is the value obtained by adding up the slope weightings of cross pixels that were found by said weighting computation unit and that were contained in each of the significant candidates; and an actual surface determination unit for, when the number computed by said number measurement unit is compared with a number belonging to other significant candidate surfaces in neighboring regions that take as a reference that significant candidate surface that has this number and that thus is determined to be a maximum, identifying the significant candidate surface having said determined number as an actual surface that is a reference surface that actually exists in said image, further comprising:

a pixel value-weighted parameter surface drawing unit for, based on a pixel value weighting found by multiplication of a combination of pose parameters that was computed by said parameter computation unit and a value computed based on pixel values of an image before binarization by said binarization unit, drawing on said parameter space parameter surfaces that accord with said surface parameter formulas;

a pixel value-weighted significant candidate extraction unit for, when at said cross point coordinates, the sum of the number of cross surfaces at which said parameter surfaces intersect each other and pixel value weightings is greater than a prescribed value, and moreover, when the number of cross surfaces are a maximum in neighboring regions that take the cross point coordinates as a reference, identifying the combination of parameters at the cross point coordinates as a significant candidate of a combination of parameters that form a reference surface that is the object of detection; and a pixel value-weighted weighting computation unit for, based on angles formed by tangent planes at cross pixels that were found by said cross determination unit and surfaces that were formed by axes of each base vector included in said parameter space, finding a slope weighting for each cross pixel that was identified by said cross determination unit, and, by multiplying these slope weightings that were found and values that were computed based on pixel values of an image before binarization by said binarization unit, finding pixel value-weighted slope weightings.

9. A pose estimation method for, based on an image that is received as input, estimating the pose of an object of pose estimation with respect to a reference surface that serves as the reference for estimating pose, said pose estimation method comprising:

a binarization process for dividing said image into a candidate region that is a candidate for said reference surface and a background region that is a region other than the candidate region;

a surface parameter formula expression process for extracting pose parameters that indicate the pose of an object of pose estimation with respect to a reference surface that appears in said image received as input and, based on the combination of values obtained by implementing a transform by a prescribed function upon, of the pose parameters that were extracted, parameters that indicate a direction in which the object of pose estimation is directed and pose parameters other than the parameters that indicate direction, finding surface parameter formulas that are numerical formulas that express said reference surface;

an all-candidate surface drawing process for, based on the combination of all pose parameters in a parameter space, which is space having, as the axes of base vectors, each of the parameters belonging to said pose parameters, drawing candidate surfaces that accord with said surface parameter formulas on the image in said parameter space;

a cross determination process for, as regards each candidate surface that was drawn in said all-candidate surface drawing process, identifying pixels that are located on, of said candidate region, the candidate surface, and pixels that are located within a prescribed range from the candidate surface as cross pixels;

a weighting computation process for, based on angles that are formed by tangent planes at cross pixels that were found in said cross determination process and planes that are formed by the axes of each base vector included in said parameter space, finding a slope weighting for each cross pixel that was identified in said cross determination process;

a number measurement process for computing for each of said candidate surface a number that is a value obtained by adding up the slope weightings of cross pixels that were found in said weighting computation process and that were contained in each of the candidate surfaces; and an actual surface determination process for, based on the numbers computed in said number measurement process, identifying an actual surface that is a reference surface that actually exists in said image from among candidate surfaces drawn in and all-candidate surface drawing process.

10. The pose estimation method according to claim 9, further comprising a smoothing process for implementing a process to smooth said image received as input, wherein, in said binarization process, a binarized image is generated based on an image that has undergone smoothing in said smoothing process.

11. The pose estimation method according to claim 9, further comprising a dilation/erosion process for subjecting a candidate region of a binarized image generated in said binarization process to a prescribed number of dilation processes for dilating the candidate region or erosion processes for eroding the candidate region.

12. The pose estimation method according to claim 9, further comprising:
an image size conversion process for changing image size by reducing or enlarging the size of any image; and
a parameter micro-adjustment process for causing alternate and repeated execution of change of image sizes of differing magnifications by said image size conversion process and identification of a new actual surface by said actual surface determinate process until reaching a prescribed number of times is reached or until a prescribed accuracy is obtained;
wherein, in said image size conversion process:
before an actual surface is identified in said actual surface determination process, a reduced image is generated by reducing at a prescribed reduction ratio said image received as input; and
after an actual surface is identified in said actual surface determination process, a new image is generated by changing said reduced image that was generated to a size that is smaller than said image received as input, and moreover, that is larger than the reduced image.

13. The pose estimation method according to claim 9, further comprising:
a parameter space coarse-graining process for increasing the discretization width of said parameter space to a predetermined width to coarsen the parameter space and find an actual surface, and after an actual surface has once been found, changing the discretization to make parameter space finer; and
a parameter micro-adjustment process for repeatedly executing derivation of new actual surfaces in parameter space of difference discretization widths in neighboring regions of an actual surface that has once been found in parameter space that has undergone said discretization until reaching a prescribed number of processes is reached or until discretization width reaches a prescribed value.

14. The pose estimation method according to claim 9, further comprising:
a positional relation estimation process for, when a plurality of actual surfaces appear in said image that is received as input, estimating both the positional relation between each of said actual surfaces and identifying the actual surfaces by placing said actual surfaces in correspondence with physical entities; and
a pose significance process for carrying out a significance process, which is a process for, based on the positional relation of said plurality of surfaces estimated in said positional relation estimation process, placing said pose parameters in correspondence with said actual surfaces to determine the pose of an object of pose estimation with respect to the actual surfaces.

15. A pose estimation method for, based on an image that is received as input, estimating the pose of an object of pose estimation with respect to a reference surface that serves as a reference for estimating the pose, said pose estimation method comprising;
a binarization process for dividing said image into a candidate region that is a candidate for said reference surface and a background region that is a region other than the candidate region;
a surface parameter formula expression process for extracting pose parameters that indicate the pose of an object of pose estimation with respect to a reference surface that appears in said image that is received as input and, based on the combination of values obtained by applying a transform by a prescribed function upon, of pose parameters that have been extracted, parameters that indicate direction in which an object of pose estimation is directed and pose parameters other than the parameters that indicate direction, finding surface parameter formulas that are numerical formulas that express said reference surface;
a parameter computation process for, based on pose parameters that were extracted in said surface parameter formula expression process, computing a combination of pose parameters that make up said surface parameter formulas that express all surfaces that pass through each pixel contained in a candidate region that was divided in said binarization process;
a parameter surface drawing process for, based on the combination of pose parameters computed in said parameter computation process, drawing parameter surfaces that accord with said surface parameter formulas on parameter space, which is space that includes each of the parameters belonging to said pose parameters as the axes of base vectors;
an intersection detection process for finding cross point coordinates, which are the coordinates of intersections through which pass a plurality of said parameter surfaces that were drawn in said parameter surface drawing process, and cross surface numbers, which are the numbers of parameter surfaces that pass through the cross point coordinates;
a significant candidate extraction process for, when the cross surface number at each cross point that was found in said intersection detection process is compared with the cross surface numbers at other cross point coordinates in prescribed neighboring regions that take the cross point coordinates corresponding to the cross surface number as a reference and is thus determined to be a maximum, identifying the combinations of pose parameters that make up the parameter surface that corresponds to the determined cross surface number as significant candidates, which are optimum combinations of pose parameters for expressing said reference surface;
a significant candidate surface drawing process for, based on a significant candidate identified in said significant candidate extraction process and a combination of pose parameters that were computed in said parameter computation process, for which a distance to said significant candidate in said parameter space in prescribed neighboring regions that take the significant candidate as a reference is no greater than a prescribed value, drawing a significant candidate surfaces on said image;
a cross determination process for, regarding each significant candidate surface that was drawn in said significant candidate surface drawing process, identifying pixels that are located on, of said candidate region, the significant candidate surface, and pixels that are located within a prescribed range from the significant candidate surface as cross pixels and finding coordinates of the cross pixels and tangent planes at said cross pixels;

a weighting computation process for, based on angles that are formed by tangent planes at the cross pixels that were found in said cross determination process and planes that are formed by the axes of each base vector included in said parameter space, finding a slope weighting for each cross pixel that was identified in said cross determination process;

a number measurement process for computing for each of said significant candidate surfaces a number that is the value obtained by adding up the slope weightings of cross pixels that were found in said weighting computation process and that were contained in each of the significant candidates; and an actual surface determination process for, when the number computed in said number measurement process is compared with a number belonging to other significant candidate surfaces in neighboring regions that take as a reference the significant candidate surface that has this number and thus is determined to be a maximum, identifying the significant candidate surface having the determined number as an actual surface that is a reference surface that actually exists in said image, further comprising:

a pixel value-weighted parameter surface drawing process for, based on pixel value weighting found by multiplication of a combination of pose parameters computed in said parameter computation process and a value that was computed based on pixel values of an image before binarization in said binarization process. drawing on said parameter space parameter surfaces that accord with said surface parameter formulas;

a pixel value-weighted significant candidate extraction process for, when at said cross point coordinates, the sum of the number of cross surfaces at which said parameter surfaces intersect each other and pixel value weightings is greater than a prescribed value, and moreover, when the number of cross surfaces is a maximum in neighboring regions that take the cross point coordinates as a reference, identifying the combination of parameters at the cross point coordinates as a significant candidate of a combination of parameters that form a reference surface that is the object of detection; and a pixel value-weighted weighting computation process for, based on angles formed by tangent planes at cross pixels that were found in said cross determination process and surfaces formed by axes of each base vector included in said parameter space, finding a slope weighting for each cross pixel that was identified in said cross determination process, and, by multiplying these slope weightings that were found and values computed based on pixel values of an image before binarization in said binarization process, finding pixel value-weighted slope weightings.

16. The pose estimation method according to claim 9, further comprising a pixel value-weighted weighting computation process for finding pixel value-weighted slope weightings by multiplying said slope weightings and values that are computed based on pixel values of an image before binarization in said binarization process.

17. A non-transitory computer readable recording record medium having recorded there on a computer-readable program for causing a computer to execute:

a binarization procedure for dividing an image received as input into a candidate region that is a candidate for a reference surface that is a reference for estimating pose and a background region that is a region other than the candidate region;

a surface parameter formula expression procedure for extracting pose parameters that indicate the pose of an object of pose estimation with respect to a reference surface that appears in said image received as input and, based on a combination of values obtained by implementing a transform by a prescribed function upon, of pose parameters that were extracted, parameters that indicate the direction in which an object of pose estimation is directed and pose parameters other than parameter that indicate direction, finding surface parameter formulas that are numerical formulas that express said reference surface;

an all-candidate surface drawing procedure for, based on a combination of all pose parameters in parameter space, which is space having, as axes of base vectors, each of the parameters belonging to said pose parameters, drawing candidate surfaces that accord with said surface parameter formulas on said image in said parameter space;

a cross determination procedure for, as regards each candidate surface that was drawn in said all-candidate surface drawing procedure, identifying pixels that are located on, of said candidate region, the candidate surface, and pixels that are located within a prescribed range from the candidate surface as cross pixels and finding coordinates of the cross pixels and tangent planes at said cross pixels;

a weighting computation procedure for, based on angles that are formed by tangent planes at cross pixels that were found in said cross determination procedure and planes that are formed by the axes of each base vector included in said parameter space, finding a slope weighting for each cross pixel that was identified in said cross determination procedure;

a number measurement procedure for computing for each of said candidate surfaces a number that is a value obtained by adding up the slope weightings of cross pixels that were found in said weighting computation procedure and that were contained in each of the candidate surfaces; and an actual surface determination procedure for, based on the numbers computed in said number measurement procedure, identifying from among candidate surfaces drawn in said all-candidate surface drawing procedure an actual surface that is a reference surface that actually exists in said image.

18. The non-transitory computer readable recording record medium according to claim 17, further comprising a smoothing procedure for implementing a process for smoothing said image received as input, wherein, in said binarization procedure, a binarized image is generated based on an image that has undergone smoothing in said smoothing procedure.

19. The non-transitory computer readable recording record medium according to claim 17, further comprising a dilation/erosion procedure for subjecting a candidate region of a binarized image generated in said binarization procedure to a prescribed number of dilation procedures for dilating the candidate region or to erosion procedures for eroding the candidate region.

20. The non-transitory computer readable recording record medium according to claim 17, further comprising: a parameter space coarse-graining procedure for increasing the discretization width of said parameter space to a predetermined width to coarsen parameter space and find an actual surface, and after an actual surface has once been found, changing discretization to make the parameter space finer; and a parameter micro-adjustment procedure for repeatedly executing derivation of new actual surfaces in the parameter space of different discretization widths in neighboring regions of an actual surface that has once been found in parameter space that has undergone said discretization until reaching a prescribed number of processes is reached or until the discretization width reaches a prescribed value.

* * * * *